(12) United States Patent
Kato et al.

(10) Patent No.: US 11,453,181 B2
(45) Date of Patent: Sep. 27, 2022

(54) PREFORM FIGURING METHOD, COMPOSITE MATERIAL SHAPING METHOD, COMPOSITE MATERIAL, AND AIRCRAFT STRUCTURAL PART

(71) Applicant: SUBARU CORPORATION, Tokyo (JP)

(72) Inventors: Saori Kato, Tokyo (JP); Yuta Inoue, Tokyo (JP); Yohei Hamamoto, Tokyo (JP); Naoyuki Sekine, Tokyo (JP); Yuji Odaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 509 days.

(21) Appl. No.: 16/179,916

(22) Filed: Nov. 3, 2018

(65) Prior Publication Data

US 2019/0275754 A1 Sep. 12, 2019

(30) Foreign Application Priority Data

Mar. 6, 2018 (JP) .............................. JP2018-039310

(51) Int. Cl.
*B29C 70/44* (2006.01)
*B29B 11/00* (2006.01)
(Continued)

(52) U.S. Cl.
CPC ............ *B29C 70/443* (2013.01); *B29B 11/00* (2013.01); *B29C 70/30* (2013.01); *B29C 70/342* (2013.01);
(Continued)

(58) Field of Classification Search
CPC ..... B29C 70/443; B29C 70/30; B29C 70/342; B29C 70/34; B29C 70/54; B29B 11/00;
(Continued)

(56) References Cited

U.S. PATENT DOCUMENTS 8,206,632 B2 * 6/2012 Rousseau ................ A61L 27/50
623/23.72
8,603,289 B2 * 12/2013 Chase ........................ B60P 3/34
156/227

(Continued)

FOREIGN PATENT DOCUMENTS

CN 101910493 A 12/2010
GB 2 452 298 A 3/2009
(Continued)

OTHER PUBLICATIONS

Extended European Search Report dated Aug. 7, 2019 for European Patent Application No. 18207143.1-1019.
(Continued)

*Primary Examiner* — Nahida Sultana
(74) *Attorney, Agent, or Firm* — McGinn I.P. Law Group, PLLC.

(57) ABSTRACT

A preform figuring method includes mounting and stacking sheet-shape fibrous preparations that have been or are yet to be impregnated with a thermosetting resin on a figuring die that has first and second figuring surfaces at least either one of which is a curved surface and making a preform for a composite material which has a curved surface that corresponds to the curved surface of the figuring die as a stack of the fibrous preparations which has layers by bending the fibrous preparations mounted on the first figuring surface onto the second figuring surface. At least a fraction of the layers that constitute the stack are formed by mounting sheet-shape fibrous preparations on the first figuring surface or the fibrous preparation adjacent in a stacking direction so that the fibrous preparations partly overlap and bending portions of the fibrous preparations mounted so as to overlap onto the second figuring surface.

17 Claims, 10 Drawing Sheets

(51) Int. Cl.
   *B29C 70/34* (2006.01)
   *B29C 70/30* (2006.01)
   *B29K 101/10* (2006.01)
   *B29K 307/04* (2006.01)
   *B29K 309/08* (2006.01)
   *B29L 31/30* (2006.01)

(52) U.S. Cl.
   CPC ...... *B29K 2101/10* (2013.01); *B29K 2307/04* (2013.01); *B29K 2309/08* (2013.01); *B29L 2031/3076* (2013.01)

(58) Field of Classification Search
   CPC ............ B29K 2101/10; B29K 2307/04; B29K 2309/08; B29L 2031/3076; Y02T 50/40
   See application file for complete search history.

(56) References Cited

U.S. PATENT DOCUMENTS

| | | | | |
|---|---|---|---|---|
| 9,573,325 | B2* | 2/2017 | Davis | B29C 70/345 |
| 9,857,148 | B2* | 1/2018 | Wilenski | F41H 5/0407 |
| 2009/0250847 | A1* | 10/2009 | Burchardt | F03D 1/0675 |
| | | | | 264/511 |
| 2010/0024971 | A1* | 2/2010 | Benson | B29C 70/32 |
| | | | | 156/245 |
| 2010/0285265 | A1 | 11/2010 | Shinoda et al. | |
| 2011/0086199 | A1* | 4/2011 | Duqueine | B29C 70/202 |
| | | | | 156/538 |
| 2016/0339682 | A1* | 11/2016 | Bahe | B29C 33/505 |
| 2016/0368229 | A1* | 12/2016 | Fernandes | B29C 70/544 |
| 2017/0057182 | A1* | 3/2017 | Bernetich | B29D 7/01 |
| 2018/0257317 | A1* | 9/2018 | Shimono | B29C 70/48 |
| 2019/0016063 | A1* | 1/2019 | Newton | B29C 70/443 |
| 2019/0275753 | A1* | 9/2019 | Kendall | B29D 99/0003 |
| 2020/0016844 | A1* | 1/2020 | Koshi | C08J 5/24 |
| 2020/0071474 | A1* | 3/2020 | Fujita | C08G 18/797 |
| 2020/0086589 | A1* | 3/2020 | Sekine | B29C 70/48 |
| 2020/0316823 | A1* | 10/2020 | Sang | B29C 70/30 |

FOREIGN PATENT DOCUMENTS

| | | |
|---|---|---|
| JP | 2002-240068 A | 8/2002 |
| JP | 2009-119619 A | 6/2009 |
| JP | 2009-191092 A | 8/2009 |
| JP | 2010-150685 A | 7/2010 |
| JP | 2017-014367 A | 1/2017 |

OTHER PUBLICATIONS

Chinese Office Action dated Feb. 17, 2022, in corresponding Chinese Patent Application No. 201910057929.0, with an English translation thereof.

* cited by examiner

PREFORM FIGURING METHOD, COMPOSITE MATERIAL SHAPING METHOD, COMPOSITE MATERIAL, AND AIRCRAFT STRUCTURAL PART

CROSS-REFERENCES TO RELATED APPLICATIONS

The present application claims priority from Japanese Patent Application No. 2018-039310 filed on Mar. 6, 2018, the entire contents of which are hereby incorporated by reference.

BACKGROUND

1. Technical Field

Examples of the invention relate to a preform figuring method, a composite material shaping method, a composite material, and an aircraft structural part.

2. Related Art

Composite materials reinforced with fiber, such as glass fiber reinforced plastics (GFRPs) and carbon fiber reinforced plastics (CFRPs), are manufactured by thermally curing an uncured thermosetting resin impregnating fiber.

Examples of representative shaping methods for composite materials include a method in which prepregs obtained by impregnating a sheet-shape fibrous preparation with a thermosetting resin are stacked and then heat-cured by an autoclave apparatus or an oven and an RTM (resin transfer molding) method in which sheet-shape fibrous preparations are stacked and then impregnated with a thermosetting resin and then the thermosetting resin is heat-cured. In particular, a method in which fiber is impregnated with a resin by carrying out vacuuming is called a VaRTM (vacuum assisted resin transfer molding) method. Furthermore, a hybrid method that uses a combination of a method in which prepregs are stacked and then heat-cured and the RTM method is also known as a shaping method for a composite material.

A stack of prepregs figured in accordance with the configuration of a composite material, a stack of fibrous preparations that are yet to be impregnated with resin in the RTM method, and a stack of fibrous preparations that have been impregnated with resin in the RTM method are called preforms in the technical field of composite material shaping. In particular, a stack of fibrous preparations that are yet to be impregnated with resin are called a dry preform. An operation of adjusting or making the shape of a preform is termed "figuring" in order to distinguish from the "shaping" of a composite material by heat curing.

Composite materials are lighter in weight and higher in strength than metals and therefore are used in an increasing range as raw materials of various component parts.

Therefore, methods that allow the shaping of a composite material that has a curved surface whose curvature is large (see, e.g., Japanese Unexamined Patent Application Publication (JP-A) No. 2010-150685, JP-A No. 2009-191092, and JP-A No. 2002-240068) have been proposed.

SUMMARY OF THE INVENTION

An aspect of the present invention provides a preform figuring method including mounting and stacking a plurality of sheet-shape fibrous preparations that are yet to be impregnated with a thermosetting resin or that have been impregnated with the thermosetting resin on a figuring die that has a first figuring surface and a second figuring surface at least either one of which is a curved surface and making a preform for a composite material. The preform has a curved surface that corresponds to the curved surface of the figuring die as a stack of the plurality of sheet-shape fibrous preparations which has a plurality of layers by bending the plurality of sheet-shape fibrous preparations mounted on the first figuring surface onto the second figuring surface. At least a fraction of the layers that constitute the stack are formed by mounting a plurality of sheet-shape fibrous preparations on the first figuring surface or on the sheet-shape fibrous preparation adjacent in a stacking direction so that the plurality of sheet-shape fibrous preparations partly overlap each other and bending portions of the plurality of sheet-shape fibrous preparations mounted so as to overlap onto the second figuring surface.

An aspect of the present invention provides a composite material shaping method including making a dry preform by the preform figuring method described above and shaping the composite material by impregnating the dry preform with the thermosetting resin and then heat-curing the thermosetting resin.

An aspect of the present invention provides a composite material shaping method including making a figured stack of prepregs by the preform figuring method described above and shaping the composite material by heat-curing the figured stack of prepregs.

An aspect of the present invention provides a composite material a platy composite material that is made of a stack of resin layers reinforced with fiber and that has a bent shape. The composite material has a shape in which a first platy portion having a flat platy shape and a second platy portion having a curved shape that is depressed when viewed from a mountain bend side are coupled. A plurality of fibers that reinforce at least a fraction of two or more of the resin layers which form one selected from the group consisting of the first platy portion and the second platy portion and that are contained in a common first resin layer are all broken in a length direction, along a first straight or curved line. A plurality of fibers that reinforce at least a fraction of two or more of the resin layers which form another one selected from the group consisting of the first platy portion and the second platy portion and that are contained in a common second resin layer whose edge fits an edge of the first resin layer are partly broken in a length direction, along a second straight or curved line that couples to the first straight or curved line at an end.

An aspect of the present invention provides an aircraft structural part composed of the composite material described above.

BRIEF DESCRIPTION OF THE DRAWINGS

FIG. 2A is a top view of a sheet-shape fibrous preparation cut into a flat planar shape. FIG. 2B is a perspective view illustrating a state in which the sheet-shape fibrous preparation illustrated in FIG. 2A has been bent in accordance with a protrusion portion of the figuring die;

FIG. 3A is a top view of a sheet-shaped fibrous preparation that has been cut into a flat planar shape. FIG. 3B is a perspective view illustrating a state in which the sheet-shape fibrous preparation illustrated in FIG. 3A has been bent in accordance with the protrusion portion of the figuring die;

DETAILED DESCRIPTION

A preform figuring method, a composite material shaping method, a composite material, and an aircraft structural part according to examples of the invention will be described with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

In the case where a composite material having a curved surface whose curvature is large is to be shaped by bending a flat planar fibrous preparation that has been impregnated with resin or that is yet to be impregnated with resin, when the bending direction of the flat planar fibrous preparation is different from the direction of curvature of the composite material and from the length direction of fibers of the fibrous preparation, the bending of the planer fibrous preparation is difficult unless the fibrous preparation is provided with cuts. This is because a flat planar fibrous preparation does not stretch nor shrink in the direction of the length of individual fibers of the fibrous preparation.

When sheet-shape fibrous preparations provided with cuts are stacked on a figuring die, performing this figuring operation so as not to allow formation of a gap in the figured preform leads to improved quality. Specifically, in order to secure a dimensional accuracy and a strength required for the composite material after shaping, it is important to avoid formation of a gap in the preform and prevent a fiber-reinforced layer from being lost after heat curing.

It is desirable to provide a technology that allows even a preform having in its part a curved surface whose curvature is large to be figured so that the figured preform will not have a gap.

Preform Figuring Method

Figure 1:
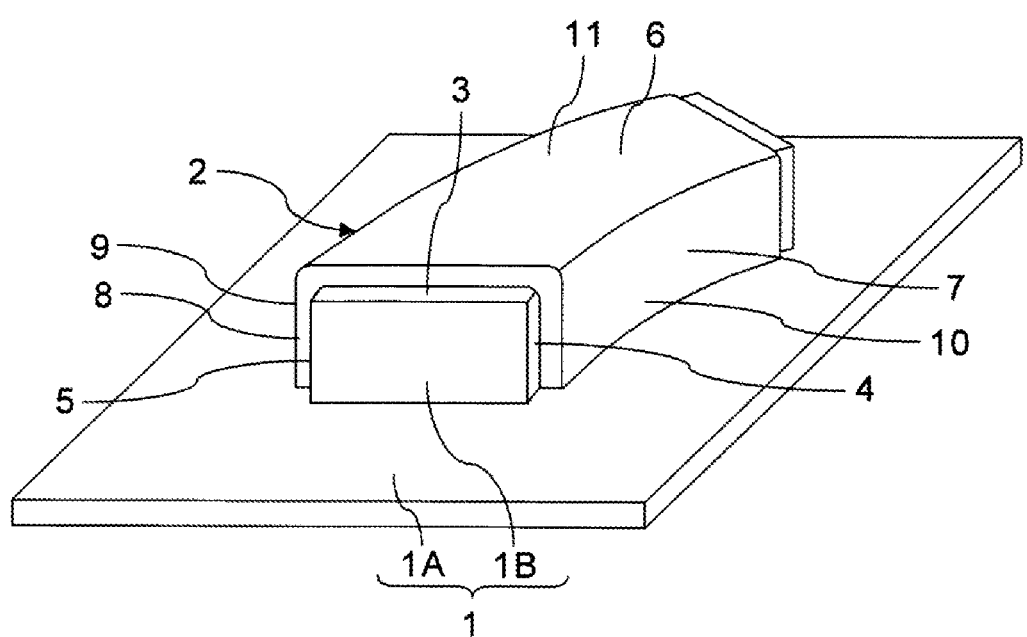
FIG. 1 is a perspective view illustrating a first example of shape of a preform that can be made by a preform figuring method according to an example of the invention.

FIG. 1 is a perspective view illustrating a first example of shape of a preform that can be manufactured by a preform figuring method according to an example of the invention.

Using a figuring die 1 that is a rigid body having a plurality of figuring surfaces that include a curved surface as illustrated as an example in FIG. 1, a platy preform 2 having a bent shape can be figured. The preform 2 is made of a raw material that is a fiber reinforced plastic (FRP) obtained by reinforcing a resin with fiber, such as CFRPs and GFRPs. The FRP is also called a composite material.

In the example illustrated in FIG. 1, the figuring die 1 has a shape that is formed by a flat plate 1A and a protrusion 1B formed on the flat plate 1A. The protrusion 1B has a shape that is formed by cutting in radial directions a doughnut shape whose cross-section is rectangular. A flat top surface of the protrusion 1B of the figuring die 1 forms a first figuring surface 3, a concave (depressed) curved surface of the protrusion 1B on its radially inner side forms a second figuring surface 4, and a convex (protuberant) curved surface of the protrusion 1B on its radially outer side forms a third figuring surface 5.

Therefore, use of the figuring die 1 allows manufacture of a preform 2 having a configuration in which a curved inner flange 7 and a curved outer flange 8 are formed on the same surface as a flat planar web 6. More concretely, a preform 2 having an elongated platy structure that has a surface configuration in which a curved surface 9 that is protuberant when viewed from its mountain bend side and a curved surface 10 that is depressed when viewed from the mountain bend side are coupled to a flat surface 11.

Of course, as coupling portions between the web 6 and the inner and outer flanges 7 and 8 are subjected to edge blunting, such as filleting (rounding) or chamfering (beveling), edges of the protrusion 1B of the figuring die 1 may also be blunted, for instance, filleted or chamfered.

The preform 2 as an object to be manufactured may be stack of a plurality of sheet-shape fibrous preparations that are yet to be impregnated with an uncured thermosetting resin or may also be a stack of a plurality of sheet-shape fibrous preparations that have been impregnated with an uncured thermosetting resin. The stack of a plurality of figured sheet-shape fibrous preparations that are yet to be impregnated with an uncured thermosetting resin is called a dry preform. On the other hand, a sheet-shape fibrous preparation that has been impregnated with an uncured thermosetting resin is called a prepreg.

Therefore, if sheet-shape prepregs are stacked on the figuring die 1, a figured stack of the prepregs can be manufactured as a preform 2. On the other hand, if a bundle of sheet-shape fibrous preparations yet to be impregnated with an uncured thermosetting resin is stacked on the figuring die 1, a dry preform can be manufactured as a preform 2.

Figure 2A:
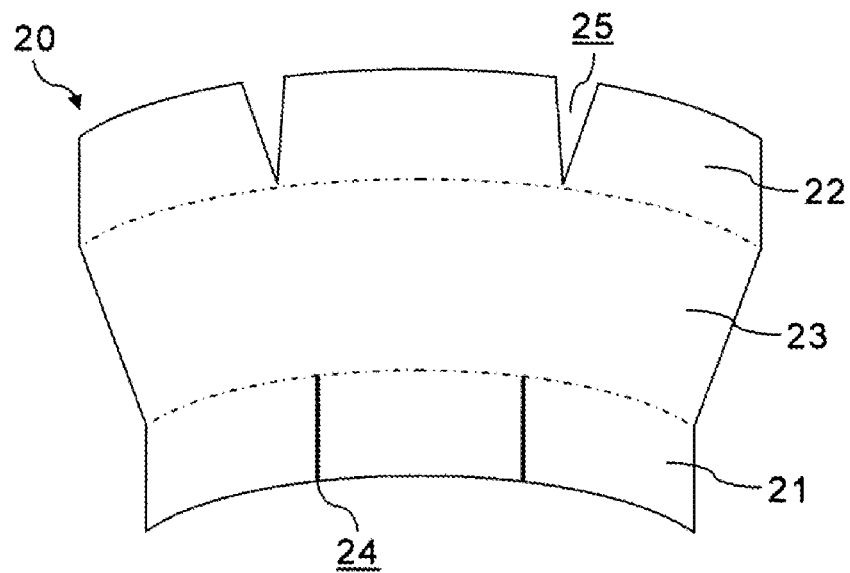
FIGS. 2A and 2B illustrate a problem that can occur in the case where sheet-shape fibrous preparations stacked in a manner of one fibrous preparation for a layer on a figuring die in order to make the preform illustrated in FIG. 1.
Figure 2B:
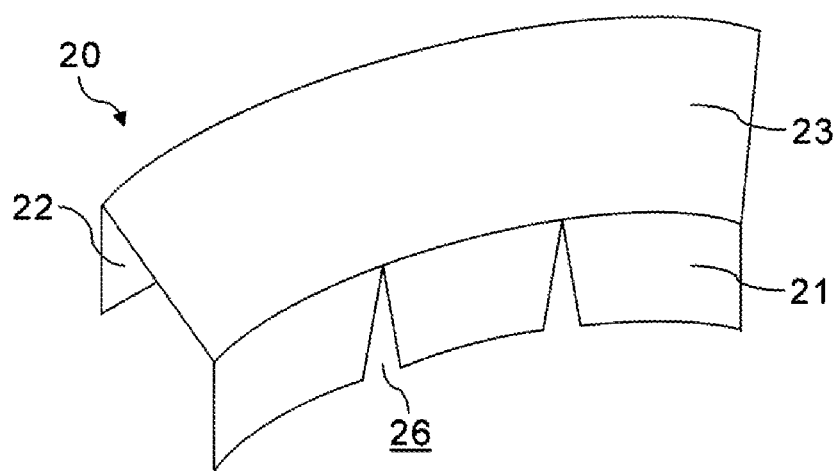

FIGS. 2A and 2B illustrate a problem that occurs when sheet-shape fibrous preparations 20 are stacked on the figuring die 1 in a manner of one preparation for each layer in order to manufacture the preform 2 illustrated in FIG. 1.

FIG. 2A is a top view of a sheet-shape fibrous preparation 20 that has been cut into a flat planar shape. FIG. 2B is a perspective view of the sheet-shape fibrous preparation 20 illustrated in FIG. 2A, illustrating a state in which the fibrous preparation 20 has been bent in accordance with the protrusion 1B of the figuring die 1.

Sheet-shape fibrous preparations 20 yet to be impregnated with resin which are raw materials of a dry preform have characteristics of having a small expandable/contractible length in the fiber length directions and having a great expandable/contractible length in directions perpendicular to the fiber length direction. This is because threadlike fibers substantially do not expand nor contract in the length directions but spaces between the fibers can expand Prepregs that are sheet-shape fibrous preparations 20 that have been impregnated with resin have characteristics of having small expandable/contactable lengths in both the fiber length directions and directions perpendicular to the fiber length direction because the resin has adhesion capacity.

Therefore, in the case where a preform 2 having a configuration in which the web 6 as illustrated in FIG. 1 is provided with the inner flange 7 and the outer flange 8 that are curved is to be manufactured, the larger the curvature of the inner flange 7, the higher the likelihood that the bending of the sheet-shape fibrous preparation 20 will be difficult. Specifically, the closer to 90 degrees the angle between the bending direction of a portion 21 of the sheet-shape fibrous preparation 20 which is an object to be bent in order to form the inner flange 7 and the fiber length direction of the bending-object portion 21, the greater the tension in a tensile direction that occurs in the fiber length direction in the bending-object portion 21, and therefore the more difficult the bending of the fibrous preparation. Furthermore, in the case of a prepreg, the adhesion capacity of the resin also causes a stress to act in the tensile direction, so that it may sometimes be more difficult to bend the prepreg.

In such a case, in order to inhibit occurrence of tension in fibers in the tensile direction or occurrence of stress in the resin in the tensile direction, it is necessary that the bending-object portion 21 of the sheet-shape fibrous preparation 20 that is to be bent in order to form the inner flange 7 while leaving unbent a portion 23 of the sheet-shape fibrous preparation 20 which is to form the flat planar web 6 be provided with linear cuts 24 whose length direction is substantially the same with the bending direction of the fibrous preparation as illustrated in FIG. 2A. On the other hand, a portion 22 of the sheet-shape fibrous preparation 20 which is an object to be bent in order to form an outer flange 8 may possibly have some slack or superposed folding, when bent, unless the bending-object portion 22 of the sheet-shape fibrous preparation 20 is provided with V-shape cuts 25.

However, when the bending-object portion 21 of the sheet-shape fibrous preparation 20 is provided with linear cuts 24 and bent so as to form the inner flange 7, inverted V-shape gaps 26 are formed as illustrated in FIG. 2B. Because the gaps 26 of the fibrous preparation 20 are a factor that reduces the strength of the composite material, it is important that the fibrous preparation 20 be not provided with any gap 26.

Figure 3A:
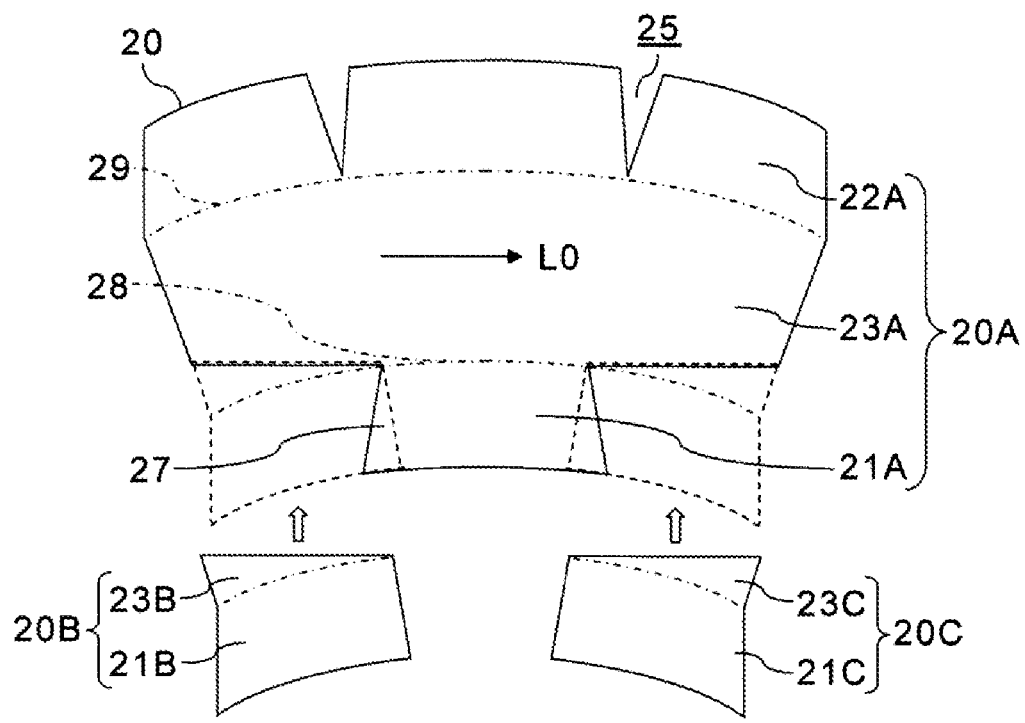
FIGS. 3A and 3B illustrate a method for reducing or preventing occurrence of gaps as illustrated in FIG. 2B by stacking a plurality of sheet-shape fibrous preparations two or more fibrous preparations for a layer on the shaping die while overlapping the two or more sheet-shape fibrous preparations for each layer partly with one another, in order to make the preform illustrated in FIG. 1.
Figure 3B:
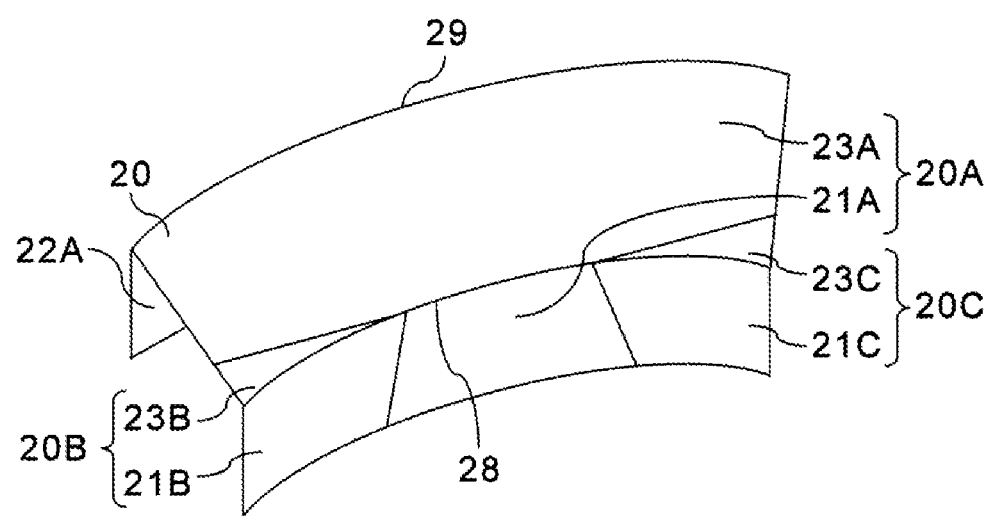

FIGS. 3A and 3B illustrate a method for reducing or preventing occurrence of a gap 26 as illustrated in FIG. 2B by staking a plurality of sheet-shape fibrous preparations 20A, 20B, and 20C for each layer on the figuring die 1 so that the fibrous preparations 20A, 20B, and 20C of each layer partly overlap one another, in order to manufacture the preform 2 illustrated in FIG. 1.

FIG. 3A is a top plan view of the sheet-shape fibrous preparations 20A, 20B, and 20C that have been cut into flat planar shapes. FIG. 3B is a perspective view illustrating a state in which the sheet-shape fibrous preparations 20A, 20B, and 20C illustrated in FIG. 3A have been bent in accordance with the protrusion 1B of the figuring die 1.

As illustrated in FIG. 3A, the sheet-shape fibrous preparations 20A, 20B, and 20C can be cut and disposed so that portions 21A, 21B, and 21C of the sheet-shape fibrous preparations 20A, 20B, and 20C overlap one another, and thus can be mounted on the first figuring surface 3 of the protrusion 1B of the figuring die 1 or on the sheet-shape fibrous preparation 20 adjacent in the stacking direction.

More concretely, the sheet-shape fibrous preparations 20A, 20B, and 20C can be disposed so that portions 23A, 23B, and 23C of the sheet-shape fibrous preparations 20A, 20B, and 20C which are not objects to be bent in order to form the flat planar web 6 fit and abut one another at their edges without overlap while edges of the portions 21A, 21B, and 21C of the fibrous preparations 20A, 20B, and 20C which are objects to be bent in order to form the inner flange 7 overlap one another. In this manner, the portions 21A, 21B, and 21C of two of the sheet-shape fibrous preparations 20A, 20B, and 20C which are mutually adjacent in directions parallel to the surface of the fibrous preparations 20A, 20B, and 20C overlap each other, forming overlap regions 27.

It is to be noted that the sheet-shape fibrous preparations 20A, 20B, and 20C are manufactured and cut so that individual fibers of the sheet-shape fibrous preparations 20A, 20B, and 20C extend continuously in their length direction without being broken in inner portions of the fibrous preparations 20A, 20B, and 20C that exclude their edges.

Then, as illustrated in FIG. 3B, the bending-object portions 21A, 21B, and 21C of the sheet-shape fibrous preparations 20A, 20B, and 20C mounted so as to overlap one another are bent along a bending line 28 for forming the inner flange 7 onto the depressed second figuring surface 4 of the protrusion 1B of the figuring die 1, so that a layer that constitutes the stack of sheet-shape fibrous preparations 20 can be formed.

Thus, it is possible to reduce or prevent occurrence of gaps 26 as illustrated in FIG. 2B. Specifically, if sufficiently large overlaps between the fibrous preparations 20A, 20B, and 20C are set, certain amounts of overlap remain between the portions 21A, 21B, and 21C of the sheet-shape fibrous preparations 20A, 20B, and 20C even after the portions 21A, 21B, and 21C are bent. Thus, the gaps 26 in the fibrous preparation can be completely closed although the thickness of the layer that forms the inner flange 7 locally increases. On the other hand, if small amounts of overlap are set, the gaps 26 in the fibrous preparation 20 can be reduced in size although the gaps 26 are not completely closed.

In the case where a composite material has requirements that the thickness of each of the layers that form the inner flange 7 be uniform the gaps 26 in fibrous preparations be closed, it suffices that the sheet-shape fibrous preparations 20A, 20B, and 20C that are to be mounted so as to overlap one another are sized so that, when the portions 21A, 21B, and 21C of the sheet-shape fibrous preparations 20A, 20B, and 20C placed so as to overlap one another are bent onto the depressed second figuring surface 4 of the figuring die 1, mutually adjacent edges of the bent portions 21A, 21B, and 21C of the sheet-shape fibrous preparations 20A, 20B, and 20C fit each other.

In the example illustrated in FIG. 3A, the size and shape of the sheet-shape fibrous preparations 20A, 20B, and 20C are set so that, as illustrated in FIG. 3B, when the portions 21A, 21B, and 21C of the sheet-shape fibrous preparations 20A, 20B, and 20C are bent onto the depressed second figuring surface 4 of the figuring die 1, edge portions of the bent portions 21A, 21B, and 21C of the sheet-shape fibrous preparations 20A, 20B, and 20C will not lie on each other and an inverted V-shape gap 26 will not be formed.

More concretely, as illustrated in FIG. 3A, a first sheet-shape fibrous preparation 20A for forming the entire outer flange 8, which forms a side having a smaller curvature, a portion of the flat planar web 6 which includes a central portion of the web 6, and a portion of the inner flange 7, which forms a side having a larger curvature, the portion including a central portion of the inner flange 7, a second sheet-shape fibrous preparation 20B for forming a portion of the web 6 which includes a side end portion of the web 6 and a portion of the inner flange 7 which includes a side end portion of the inner flange 7, and a third sheet-shape fibrous preparation 20C for forming a portion of the web 6 which includes another side end portion of the web 6 and a portion of the inner flange 7 which includes another side end portion of the inner flange 7 are prepared beforehand as raw materials.

Furthermore, the first sheet-shape fibrous preparation 20A, the second sheet-shape fibrous preparation 20B, and the third sheet-shape fibrous preparation 20C are sized so that, when the portions 23A, 23B, and 23C that form a layer of the web 6 are disposed with mutually adjacent edges thereof fitting each other, mutually adjacent edge portions of the portions 21A, 21B, and 21C that form a layer of the inner flange 7 lie on each other so as to form the inverted V-shape overlap regions 27.

Therefore, when the first sheet-shape fibrous preparation 20A, the second sheet-shape fibrous preparation 20B, and the third sheet-shape fibrous preparation 20C are bent along the bending line 28 for the inner flange 7, the mutually adjacent edges of the portions 21A, 21B, and 21C that form the layer of the inner flange 7 fit each other, so that formation of a gap 26 is avoided without increasing the thickness of the layer of the inner flange 7. Incidentally, the order in which the portions 21A, 21B, and 21C of the sheet-shape fibrous preparations 20A, 20B, and 20C are overlapped with one another is arbitrary.

That is, when a curved surface that is depressed when viewed from the mountain bend side is to be formed by bending a plurality of sheet-shape fibrous preparations 20, the sheet-shape fibrous preparations 20 can be sized and disposed so that the sheet-shape fibrous preparations 20 that form a depressed curved surface do not form any gap and so that, in an unfolded flat planar state, the sheet-shape fibrous preparations 20 overlap each other.

On the other hand, in the case where a plurality of sheet-shape fibrous preparations 20 are bent so as to form a curved surface that is protuberant when viewed from the mountain bend side, the sheet-shape fibrous preparations 20 may be provided with gaps beforehand so as to avoid formation of superposed folds if it is considered particularly important to improve the uniformity of the thickness of each one of layers that form the protuberant curved surface.

As a concrete example, as illustrated in FIG. 3A, a portion 22A of a first sheet-shape fibrous preparation 20A which is an object to be bent along a bending line 29 for the outer flange 8 may be provided with V-shape cuts 25. Therefore, by bending the first sheet-shape fibrous preparation 20A mounted on the first figuring surface 3 of the figuring die 1, along the bending line 29, onto the third figuring surface 5 that is a protuberant curved surface, a layer of the outer flange 8 having a curved surface that is protuberant when viewed from the side where a mountain bend is formed can be formed with a uniform thickness without allowing formation of superposed folding of the first sheet-shape fibrous preparation 20A.

As illustrated as an example in FIGS. 3A and 3B, in the case where a certain layer of a stack of sheet-shape fibrous preparations 20 is composed of a combination of a plurality of sheet-shape fibrous preparations 20, increasing the number of sheet-shape fibrous preparations 20 will result in loss of fibrous continuity between sheet-shape fibrous preparations 20. Therefore, it is preferable that the number of sheet-shape fibrous preparations 20 that are combined in a common layer be as small as possible, from the viewpoint of improving the strength of the composite material.

Furthermore, it is preferable that the edges of sheet-shape fibrous preparations 20 that are combined in a common layer be as short as possible. In particular, it is important that the edges thereof that are not parallel to the fiber length direction be as short as possible, from the viewpoint of improving the strength of the composite material. Specifically, it is particularly important to minimize the lengths of the edges of the sheet-shape fibrous preparations 20 which becomes a cause of breakage of fibers in the length direction.

On the other hand, as for the curved surface depressed when viewed from the mountain bend side, it is important that the number of sheet-shape fibrous preparations 20 that form the curved surface be such an appropriate number that excessive tension does not occur in the fibrous preparations.

Specifically, it is important that the curved surface depressed when viewed from the mountain bend side be formed by joining a plurality of sheet-shape fibrous preparations 20 at appropriate intervals so that the sheet-shape fibrous preparations 20 joined can be bent. The appropriate widths of the curved surface-forming sheet-shape fibrous preparations 20 necessary to avoid occurrence of excessive tension in the sheet-shape fibrous preparations 20 vary depending on the curvature of the curved surface.

Concretely, there is a relation in which as the curvature of the curved surface increases, it is more appropriate to increase the number of sheet-shape fibrous preparations 20 combined and therefore decease the widths of the individual sheet-shape fibrous preparations 20 and, conversely, as the curvature of the curved surface decreases, the number of sheet-shape fibrous preparations 20 combined can be reduced by increasing the widths of the individual sheet-shape fibrous preparations 20. The appropriate number and widths of sheet-shape fibrous preparations 20 according to the curvature of the curved surface can be determined by tests, simulations, etc.

Furthermore, when sheet-shape fibrous preparations 20 combined in a common layer in a stack of sheet-shape fibrous preparations 20 are laid and stacked on the figuring die 1, it is necessary that the individual sheet-shape fibrous preparations 20 combined in the common layer be laid so as not to slip and fall off by gravity. Therefore, it is necessary that a plurality of sheet-shape fibrous preparations 20 mounted on the first figuring surface 3 of the figuring die 1 so as to overlap one another be sized and disposed so that, when portions of the sheet-shape fibrous preparations 20 mounted on the first figuring surface 3 are bent onto the depressed second figuring surface 4 of the figuring die 1, remainders thereof will remain on the first figuring surface 3. In other words, it is necessary that the sheet-shape fibrous preparations 20 that are mounted overlapping one another be sized and disposed so that portions of the sheet-shape fibrous preparations 20 mounted overlapping one another are present, without fail, on top of the first figuring surface 3.

Therefore, in the case where a preform 2 having a shape illustrated as an example in FIG. 1 is to be figured by using a common figuring die 1, sheet-shape fibrous preparations 20 for forming the flat planar web 6, the inner flange 7, and the outer flange 8 cannot be separately sized and disposed and then combined.

As described above, it is appropriate that a plurality of sheet-shape fibrous preparations 20 combined for use for a layer be sized and disposed according to a condition that the lengths of edges of sheet-shape fibrous preparations 20 that are a cause of loss of the continuity of fibers in the length direction be made as short as possible, a condition that the sheet-shape fibrous preparations 20 that form curved surfaces have widths in the fiber length direction set equal to or less than an appropriate width so that the sheet-shape fibrous preparations 20 combined can be bent to form the curved surfaces without allowing excessive tension to occur in the fibrous preparations, and a condition that a portion of each of the sheet-shape fibrous preparations 20 combined in a common layer be disposed on top of the first figuring surface 3.

For instance, in the case where a preform 2 having a shape illustrated as an example in FIG. 1 is manufactured by using the figuring die 1, when sheet-shape fibrous preparations 20 made up of threadlike fibers whose length direction is substantially parallel to a plane that touches a side surface of the inner flange 7 or the outer flange 8 at its center are objects to be stacked, a plurality of sheet-shape fibrous preparations 20 that form a certain common layer can be sized and disposed as illustrated in FIG. 3A.

Concretely, the size and shape of the non-bending-object portions 23B and 23C of the second sheet-shape fibrous preparation 20B and the third sheet-shape fibrous preparation 20C which are not to be bent in order to form the flat planar web 6 are set so that the edges of the sheet-shape fibrous preparation 20 substantially perpendicular to the fiber length direction L0 which becomes a cause of discontinuity of fibers are as short as possible. On the other hand, the portions 21A, 21B, and 21C of the first, second, and third sheet-shape fibrous preparations 20A, 20B, and 20C which form a curved surface that is depressed when viewed from the mountain bend side after the bending has been performed are sized so that the width of each of the portions 21A, 21B, and 21C in the fiber length direction L0 is set equal to or less than a certain width so as to avoid occurrence of excessive tension in the fibers.

The preform 2 is configured by stacking a plurality of sheet-shape fibrous preparations 20 in a stacking direction by an automatic stacking apparatus or by an operator's manual operation. Therefore, it is important to combine a plurality of sheet-shape fibrous preparations 20 for each layer so that excessive fiber tension does not occur in each layer.

If settings are made such that the overlap regions 27 between the sheet-shape fibrous preparations 20 that form each one of layers of the preform 2 will be at the same locations in the layers, then the sheet-shape fibrous preparations 20 that are objects to be stacked will be uniform in shape and in the stacking location provided that the effect of the thickness of the preform 2 is ignored. This facilitates automatization of the stacking of sheet-shape fibrous preparations 20 that employs an automatic stacking apparatus.

However, it is to be noted that if settings are made such that the overlap regions 27 between the sheet-shape fibrous preparations 20 are at the same locations in the layers, there occurs a plane where fibers are broken or divided in their length direction. Specifically, edges of a plurality of sheet-shape fibrous preparations 20 that are combined after being bent will be disposed on a plane parallel to the thickness direction of the preform 2. As a result, end portions of many threadlike fibers will be disposed on a plane parallel to the thickness direction of the preform 2, leading to reduced strength of the composite material.

Therefore, from the viewpoint of reducing the reduction of strength of the composite material, it is desirable that the locations of the overlap regions 27 be differentiated among the layers in the stack of the sheet-shape fibrous preparations 20 which forms the preform 2.

Figure 4A:
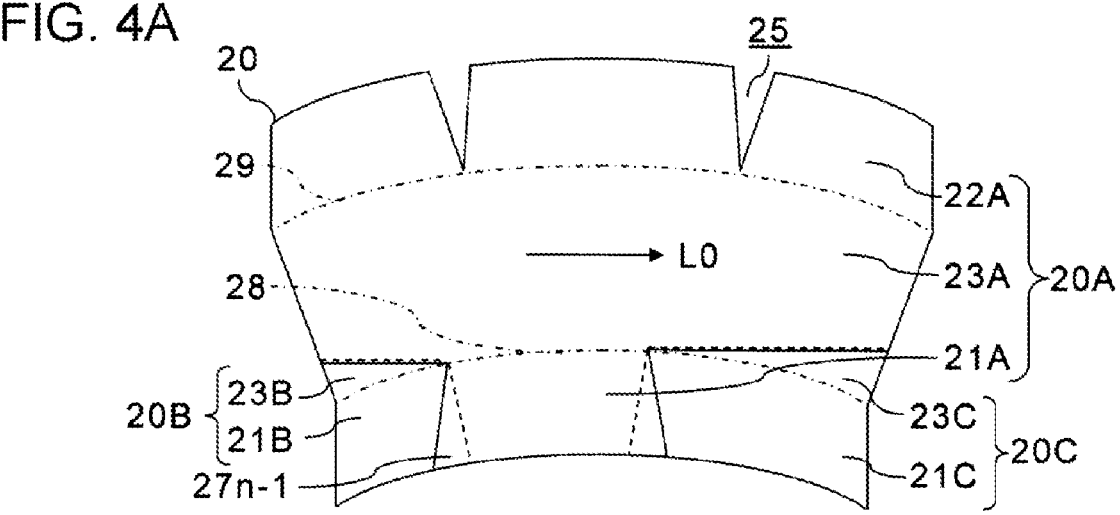
FIGS. 4A to 4C illustrate an example in which sheet-shape fibrous preparations are stacked while the locations of overlap regions are differentiated among the layers in the stack of sheet-shape fibrous preparations which constitutes a preform.
Figure 4B:
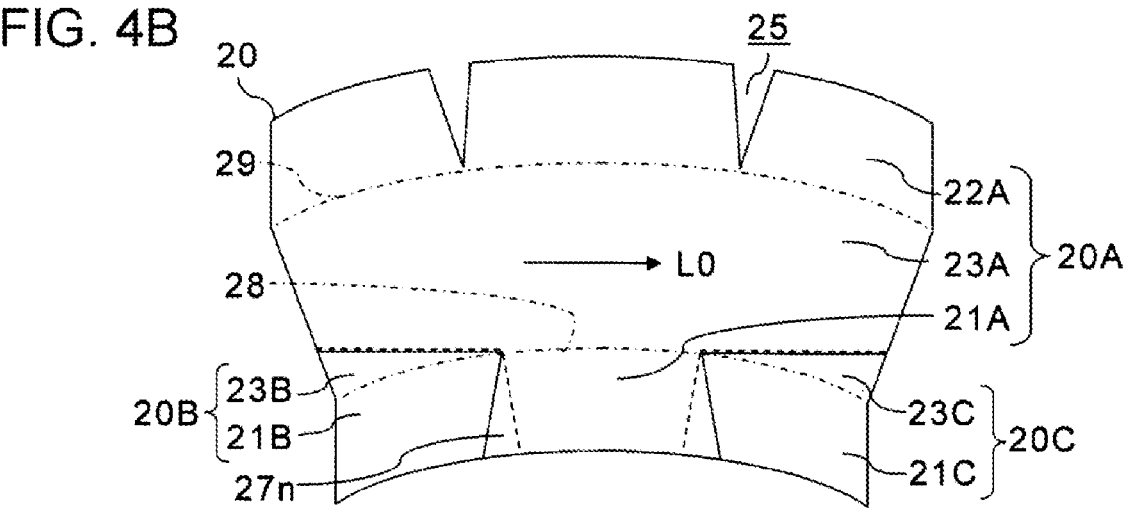
Figure 4C:
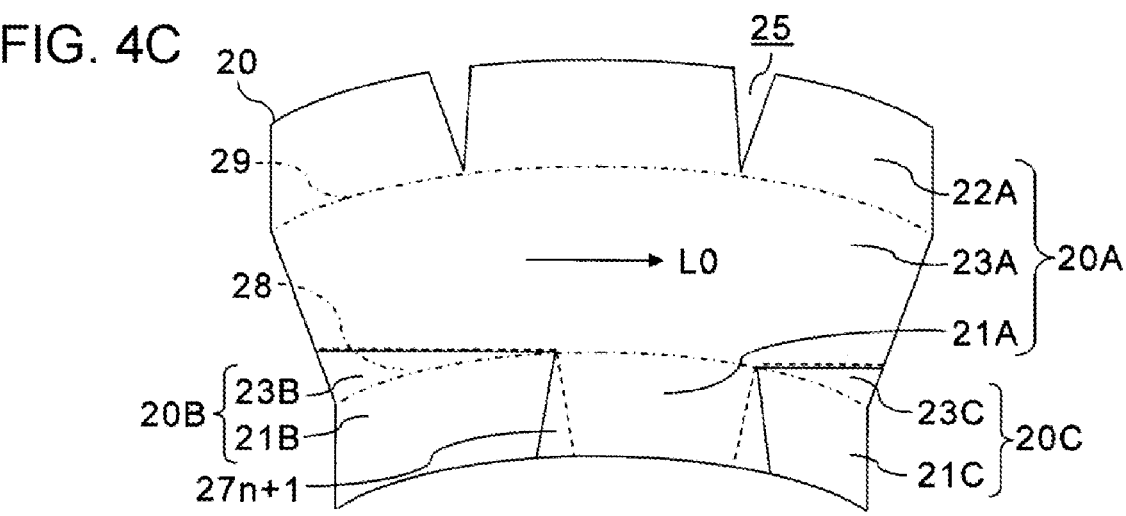

FIGS. 4A, 4B, and 4C illustrate an example in which sheet-shape fibrous preparations 20 that form a preform 2 are stacked while the locations of the overlap regions 27 are differentiated among layers in the stack of the sheet-shape fibrous preparation 20.

Sheet-shape fibrous preparations 20A, 20B, and 20C in the (n−1)th layer illustrated in FIG. 4A and sheet-shape fibrous preparations 20A, 20B, and 20C in the nth layer illustrated in FIG. 4B can be sized and disposed so that the overlap regions 27n−1 between the portions 21A, 21B, and 21C of the sheet-shape fibrous preparations 20A, 20B, and 20C in the (n−1)th layer and the overlap regions 27n between the portions 21A, 21B, and 21C of the sheet-shape fibrous preparations 20A, 20B, and 20C in the nth layer are shifted from each other. Note that n is an integer greater than or equal to 2.

Then, it is possible to avoid an event in which edges of the bent portions 21A, 21B, and 21C of the sheet-shape fibrous preparations 20A, 20B, and 20C in the (n−1)th layer and edges of the bent portions 21A, 21B, and 21C of the sheet-shape fibrous preparations 20A, 20B, and 20C in the nth layer are aligned on a single plane.

Likewise, the sheet-shape fibrous preparations 20A, 20B, and 20C in the nth layer illustrated in FIG. 4B and sheet-shape fibrous preparations 20A, 20B, and 20C in the (n+1)th layer illustrated in FIG. 4C can be sized and disposed so that the overlap regions 27n between the portions 21A, 21B, and 21C of the sheet-shape fibrous preparations 20A, 20B, and 20C in the nth layer and the overlap regions 27n+1 between the portions 21A, 21B, and 21C of the sheet-shape fibrous preparations 20A, 20B, and 20C in the (n+1)th layer are shifted from each other.

Then, it is possible to avoid an event in which edges of the bent portions 21A, 21B, and 21C of the sheet-shape fibrous preparations 20A, 20B, and 20C in the nth layer and edges of the bent portions 21A, 21B, and 21C of the sheet-shape fibrous preparations 20A, 20B, and 20C in the (n+1)th layer are aligned on a single plane.

As a result, disposal of end portions of many threadlike fibers on a plane parallel to the thickness direction of the preform 2 can be avoided and therefore reduction of strength of the composite material can be prevented. Specifically, formation of a plane where fibers are broken within the preform 2 can be avoided.

Note that if a strength of the composite material is secured, the overlap regions 27 may be differentiated every two or more layers instead of every layer. Furthermore, instead of shifting the locations of the overlap regions 27 among all the layers, it is also permissible to shift the locations of the overlap regions 27 among only a fraction of the layers.

Concretely, the locations of the overlap regions 27 may be alternated between two sets of locations every layer or every two or more layers. Alternatively, the locations of the overlap regions 27 may be successively shifted by a constant amount of shift from one layer to an adjacent layer. Regularizing the pattern in which the locations of the overlap regions 27 are shifted among layers facilitates the stacking of sheet-shape fibrous preparations 20 that employs an automatic stacking apparatus. For instance, by providing a sliding mechanism that slides an automatic stacking apparatus or the figuring die 1 or using a plurality of automatic stacking apparatuses in rotation, it becomes possible to automatically stack or lay a plurality of sheet-shape fibrous preparations 20 while partially overlapping a fraction of the sheet-shape fibrous preparations 20 with one another.

In the case where the preform 2 is thick, the curvature of a curved surface changes every time the curved surface is overlaid with a sheet-shape fibrous preparation 20.

Therefore, an arrangement in which only a fraction of the layers (in this case, only one or more of the layers) that have large curvatures are formed by a plurality of sheet-shape fibrous preparations 20 may be adopted. Furthermore, the number of sheet-shape fibrous preparations 20 and the maximum widths of sheet-shape fibrous preparations 20 in the fiber length direction may be varied among layers.

Therefore, at least a fraction of the layers in the stack of sheet-shape fibrous preparations 20 which forms the preform 2 can be formed by disposing a plurality of sheet-shape fibrous preparations 20 in directions parallel to the sheet-shape fibrous preparations 20. In that case, too, varying the location or locations at which a fraction of sheet-shape fibrous preparations overlap each other among a fraction of the layers in the stack of sheet-shape fibrous preparations 20 leads to inhibition of the reduction of strength of the composite material.

Although FIGS. 4A, 4B, and 4C illustrate an example in which a preform 2 and a composite material is manufactured as a unidirectional material in which the fibers have the same length direction, the fiber length direction may also be varied among layers of sheet-shape fibrous preparations 20. Generally, the fiber length direction has been standardized. Prepreg sheets and fibrous sheets whose fiber orientation angles are 0 degrees, 45 degrees, and 90 degrees are commercially available. Therefore, preforms 2 and composite materials can be manufactured by combining sheet-shape fibrous preparations 20 that have different orientation angles.

Figure 5A:
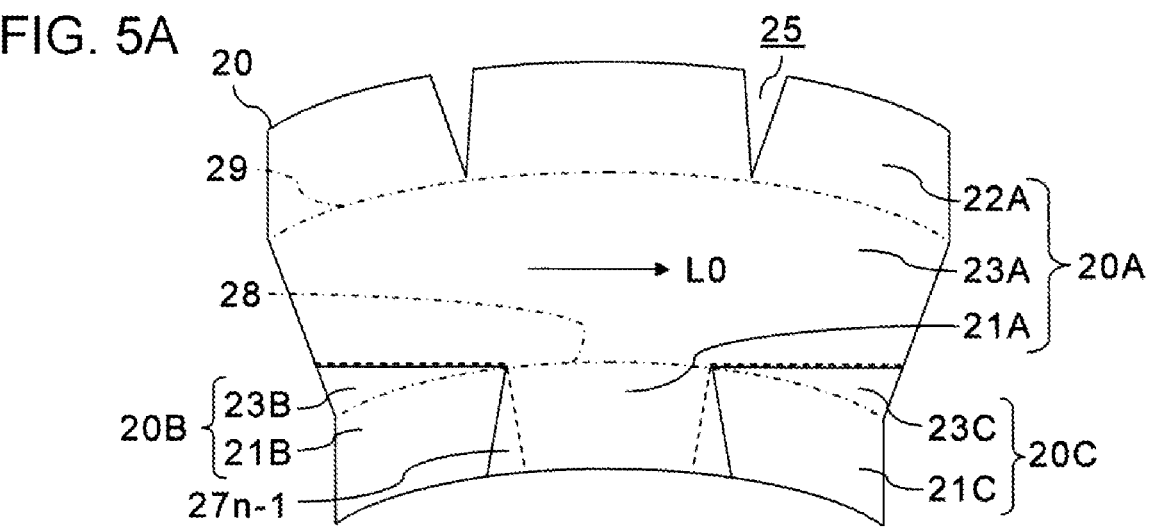
FIGS. 5A to 5C illustrate an example in which sheet-shape fibrous preparations are stacked while both the locations of overlap regions and the direction of the length of fibers are differentiated among the layers in the stack of sheet-shape fibrous preparations which constitutes a preform.
Figure 5B:
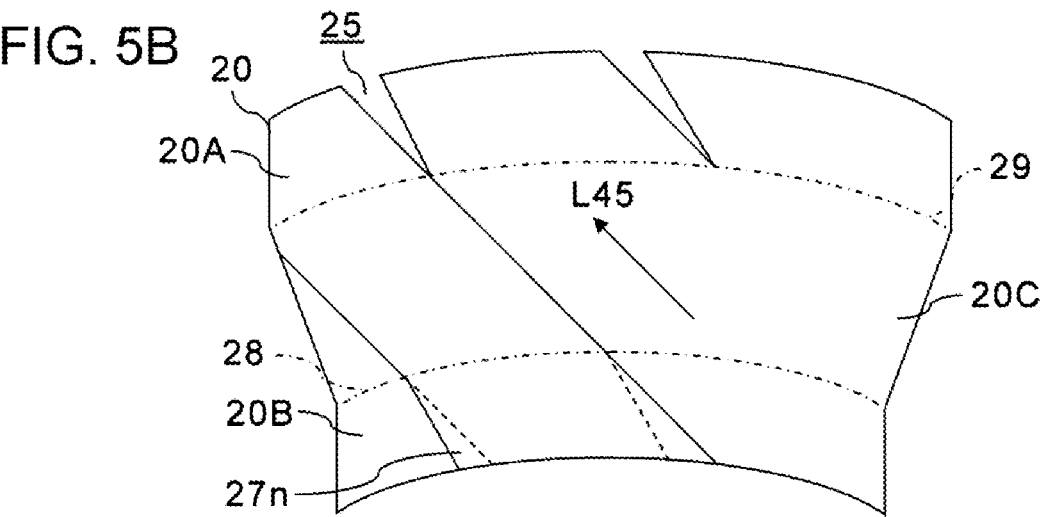
Figure 5C:
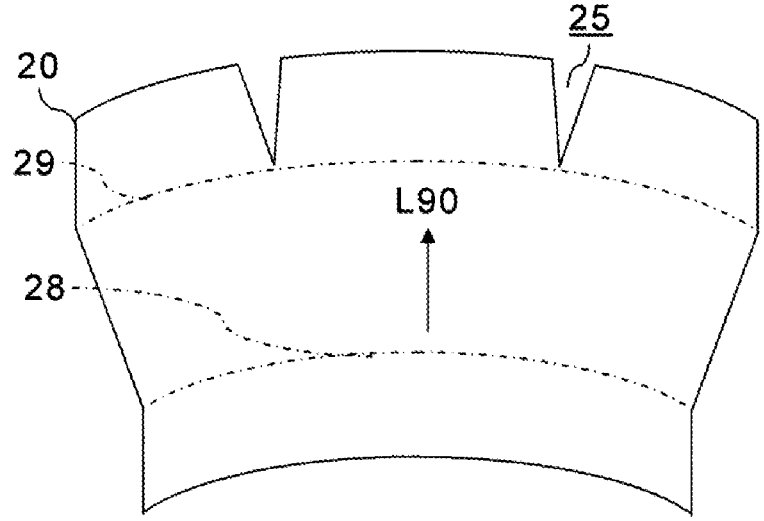

FIGS. 5A, 5B, and 5C illustrate an example in which a preform 2 is formed by stacking sheet-shape fibrous preparations 20 in such a manner that both the locations of overlap regions 27 and the fiber length directions are varied among the layers in the stack of the sheet-shape fibrous preparations 20.

As illustrated in FIG. 5A, the fiber orientation angle of sheet-shape fibrous preparations 20A, 20B, and 20C in the (n−1)th layer can be set to 0 degrees and the fiber length direction L0 can be set substantially parallel to a plane that touches a side surface of the inner flange 7 or the outer flange 8 at its center. Then, the sheet-shape fibrous preparations 20A, 20B, and 20C can be sized and disposed so that the portions 21A, 21B, and 21C of the sheet-shape fibrous preparations 20A, 20B, and 20C in an unfolded state overlap one another.

In this case, similarly to the example illustrated in FIG. 3A, it is preferable, from the viewpoint of inhibiting the reduction of strength of the composite material, that, with regard to edges of the sheet-shape fibrous preparations 20A, 20B, and 20C which are caused to abut each other, the lengths of the edges in directions that are not parallel to the fiber length direction L0 and, particularly, directions that are oblique at "steep" angles that are angles greater than or equal to 45 degrees and less than or equal to 135 degrees to the fiber length direction L0 be as short as possible. Therefore, as illustrated as an example in FIG. 3A, sheet-shape fibrous preparations 20A, 20B, and 20C can be sized and disposed so that, with regard to the edges of sheet-shape fibrous preparations 20A, 20B, and 20C which are caused to abut each other, the lengths of the edges in directions that are not parallel to the fiber length direction L0 are as short as possible.

Next, as illustrated in FIG. 5B, the orientation angle of the sheet-shape fibrous preparations 20A, 20B, and 20C in the nth layer can be set to 45 degree and a fiber length direction L45 can be set to a direction that is oblique at an angle of substantially 45 degree to a plane that touches a side surface of the inner flange 7 or the outer flange 8 at its center. In this case, the direction that is not parallel to the length direction L45 of fibers whose orientation angle is 45 degrees is oblique at 45 degrees to the direction that is not parallel to the length direction L0 of fibers whose orientation angle is 0 degrees.

Therefore, for instance, as illustrated in FIG. 5B, shapes of the sheet-shape fibrous preparations 20A, 20B, and 20C can be determined and cut such that the sheet-shape fibrous preparations 20A, 20B, and 20C are provided with edges that include as many edges in directions parallel to the fiber length direction L45 and in directions oblique at shallow angles (angles other than the aforementioned steep angles) to the fiber length direction L45 as possible.

As a result, the sites where fibers are broken in the length direction can be reduced and superposition or overlap of the regions of discontinuation of fibers in the (n−1)th layer and the regions of discontinuation of fibers in the nth layer can be avoided.

Next, as illustrated in FIG. 5C, the orientation angle of fibers of sheet-shape fibrous preparations 20A, 20B, and 20C in the n+1 layer can be set to 90 degrees and a fiber length direction L90 of the sheet-shape fibrous preparations 20A, 20B, and 20C can be set substantially perpendicular to a plane that touches a side surface of the inner flange 7 or the outer flange 8 at its center. In this case, when the curvature of the inner flange 7 is extremely large, the bending directions of the sheet-shape fibrous preparations 20A, 20B, and 20C are substantially the same direction as the fiber length direction L90 or directions oblique at shallow angles to the fiber length direction L90.

Therefore, in the case where a dry preform is figured by stacking sheet-shape fibrous preparations 20 that are yet to be impregnated with resin, the intervals between threadlike fibers are relatively expandable so that sheet-shape fibrous preparations 20 can be bent along the bending line 28 for the inner flange 7 without allowing occurrence of excessive tension in the fiber length direction provided that the curvature of the inner flange 7 is not extremely large. In other words, the sheet-shape fibrous preparations 20 can be bent along the bending line 28 for the inner flange 7 without allowing a local gap 26 to form, by spreading a plurality of threadlike fibers that form the sheet-shape fibrous preparations 20, if the curvature of the inner flange 7 is not extremely large.

Therefore, as illustrated in FIG. 5C, the n+1 layer can be formed by using a single sheet-shape fibrous preparation 20 instead of using a plurality of divided sheet-shape fibrous preparations 20. This minimizes the reduction of continuity of fibers to a substantially inevitable level and improves the strength of the composite material.

However, when a stack of prepregs is figured by stacking sheet-shape prepregs obtained by impregnating sheet-shape fibrous preparations 20 with resin, the adhesion capacity of the resin makes it hard for the intervals between threadlike fibers to expand in comparison with sheet-shape fibrous preparations 20 that are yet to be impregnated with resin. Therefore, when a stack of prepregs is figured, the n+1 layer may be formed by placing a plurality of sheet-shape fibrous preparations 20 that have edges in the fiber length direction L90 and edges oblique at shallow angles to the fiber length direction L90 so that the sheet-shape fibrous preparations 20 abut each other. In this case, each of the plurality of prepregs forms the (n+1)th layer of portions of the web 6, the inner flange 7, and the outer flange 8, and the (n+1) layer of the web 6, the inner flange 7, and the outer flange 8 is formed by the plurality of prepregs.

The orientation angle of fibers may also be varied every two or more layers, instead of every layer, according to the strength required for the composite material. Specifically, the fiber length direction may be varied among at least a fraction of the layers in a stack of sheet-shape fibrous preparations 20. Furthermore, the number and shapes of sheet-shape fibrous preparations 20 that form a layer and the shapes and locations of overlap regions 27 in the case where the number of sheet-shape fibrous preparations 20 is two or more may be set according to the fiber length direction so that the continuity of fibers in the length direction is maintained as much as possible.

Particularly, with regard to a layer in which bending of a sheet-shape fibrous preparation 20 does not cause excessive tension in the fibers, it is preferable that the layer be formed by one sheet-shape fibrous preparation 20. Therefore, at least a fraction of the layers in a stack of sheet-shape fibrous preparations 20 that forms a preform 2 may each be formed by disposing a plurality of sheet-shape fibrous preparations 20 in directions parallel to the sheet-shape fibrous preparations 20.

When a dry preform is to be manufactured as a preform 2, there occur many cases where merely stacking a plurality of sheet-shape fibrous preparations 20 on the figuring die 1 of the protrusion 1B cannot accomplish sufficient figuring of the dry preform. In such a case, it is appropriate that the stack of sheet-shape fibrous preparations 20 be pressurized by pressing a rigid-body upper die against the stack or the stack be pressurized through the use of the atmospheric pressure by bagging the stack of sheet-shape fibrous preparations 20.

Furthermore, a binder in the form of a sheet or powder may be placed within a stack of sheet-shape fibrous preparations 20 to figure a dry preform. When a dry preform is to be figured by using a thermoplastic binder, a stack of sheet-shape fibrous preparations 20 is heated by a heating apparatus.

When a figured stack of prepregs is to be manufactured as a preform 2, merely stacking sheet-shape prepregs on the protrusion 1B of the figuring die 1 can accomplish the figuring due to the adhesion capacity of the uncured resin and the weight of the prepregs provided that the shape of the stack is a simple shape. However, in the case where merely stacking sheet-shape prepregs on the protrusion 1B of the figuring die 1 cannot accomplish sufficient figuring, such as the case where a complicated shape is to be figured, pressurization using the upper die or a bagging technique can be performed as in the case where a dry preform is to be manufactured.

Figure 6:
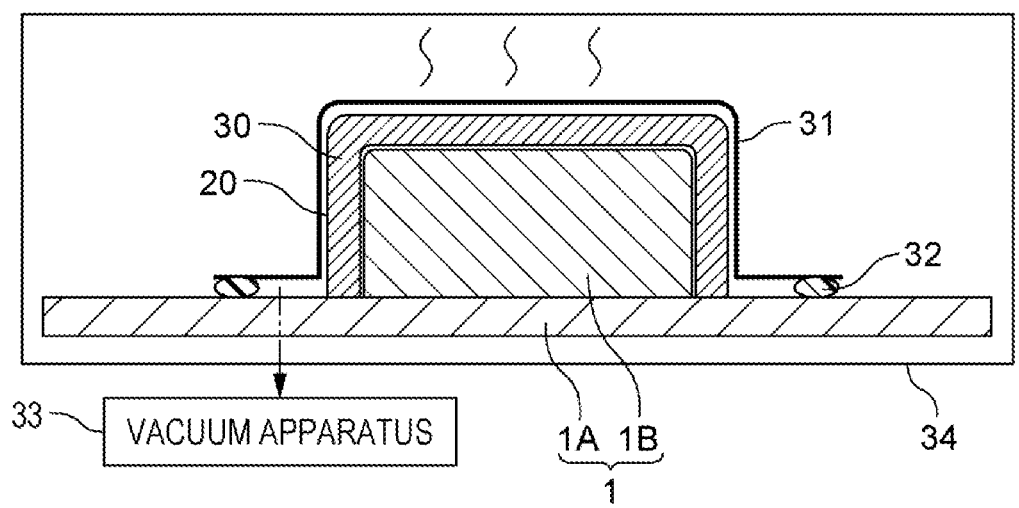
FIG. 6 is a cross-sectional view of a figuring die, illustrating an example in which, using the figuring die illustrated in FIG. 1, a preform is made, while a stack of sheet-shape fibrous preparations is being bagged.

FIG. 6 is a cross-sectional view of the figuring die 1 illustrated in FIG. 1, illustrating an example in which a preform 2 is manufactured by using the figuring die 1 and also performing the bagging of a stack 30 of sheet-shape fibrous preparations 20.

When the bagging of the stack 30 of sheet-shape fibrous preparations 20 that are yet to be impregnated with resin or that have been impregnated with resin is to be performed, the stack 30 of the sheet-shape fibrous preparations 20 can be tightly closed, as illustrated in FIG. 6, by covering the stack 30 of the sheet-shape fibrous preparations 20 stacked on the protrusion 1B of the figuring die 1 with a bagging film 31 and adhering edges of the bagging film 31 to the flat plate 1A of the figuring die 1 by a sealant 32.

Next, the region tightly closed by the bagging film 31 can be depressurized by a vacuum apparatus 33. Incidentally, the vacuum apparatus 33 may be connected to the bagging film 31 or to the figuring die 1 by a vacuum hose. Vacuuming performed by the vacuum apparatus 33 can apply to the stack 30 of the sheet-shape fibrous preparations 20 a differential pressure between the atmospheric pressure and the pressure within the region tightly closed by the bagging film 31. Specifically, bagging the stack 30 of the sheet-shape fibrous preparations 20 with the bagging film 31 can pressurize the stack 30 of the sheet-shape fibrous preparations 20. Thus, a figured preform 2 can be acquired.

Furthermore, when a dry preform is to be figured by using a thermoplastic binder, a stack 30 of sheet-shape fibrous preparations 20 needs to be heated to a temperature at which the binder melts Therefore, for instance, a heating apparatus 34 may be provided within the figuring die 1 so as to melt the thermoplastic binder. Of course, a bagged stack 30 of sheet-shape fibrous preparations 20 may be introduced, together with the figuring die 1, into an independent heating apparatus 34 such as an oven.

Figure 7:
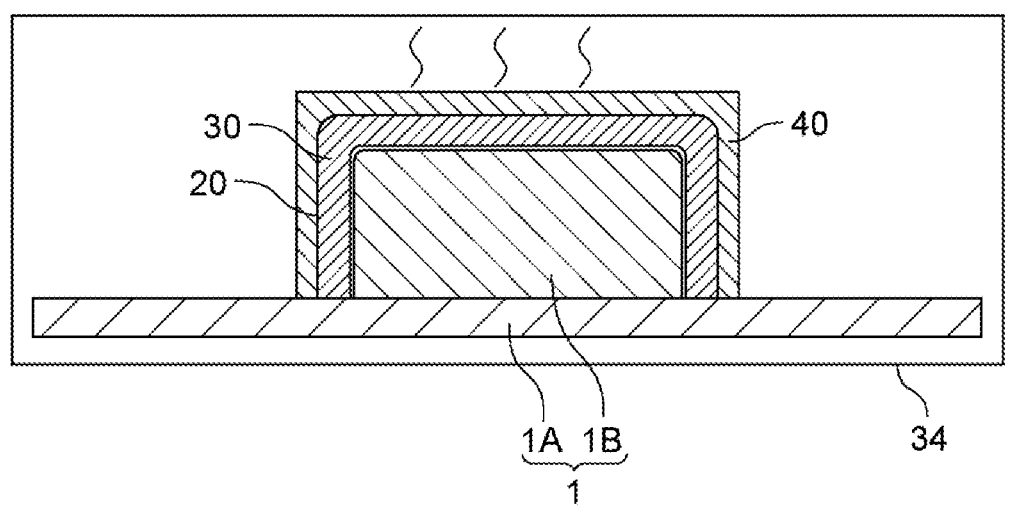
FIG. 7 is a cross-sectional view of a figuring die and an upper die, illustrating an example in which a preform is made by clamping a stack of sheet-shape fibrous preparations between the figuring die illustrated in FIG. 1 and an upper die.

FIG. 7 is a cross-sectional view of the figuring die 1 and an upper die 40, illustrating an example in which a preform 2 is manufactured by clamping a stack 30 of sheet-shape fibrous preparations 20 between the figuring die 1 illustrated in FIG. 1 and an upper die 40.

As illustrated in FIG. 7, the stack 30 of sheet-shape fibrous preparations 20 may be clamped between an upper die 40 provided with a depression portion that fits the figured shape of the preform 2 and a figuring die 1 that functions as a lower die. Therefore, a figured preform 2 can be acquired.

In the case where a stack 30 of sheet-shape fibrous preparations 20 is clamped between the figuring die 1 and the upper die 40, too, when a dry preform is to be figured by using a thermoplastic binder, the stack 30 of the sheet-shape fibrous preparations 20 needs to be heated to a temperature at which the binder melts. Therefore, for instance, the figuring die 1 and/or the upper die 40 may be provided with a built-in heating apparatus 34 such that the thermoplastic binder is melted. Of course, a stack 30 of sheet-shape fibrous preparations 20 may be introduced, together with the figuring die 1 and the upper die 40, into an independent heating apparatus 34 such as an oven.

Next, other examples of the shape of a preform 2 that can be formed by the foregoing preform figuring method will be described.

Figure 8:
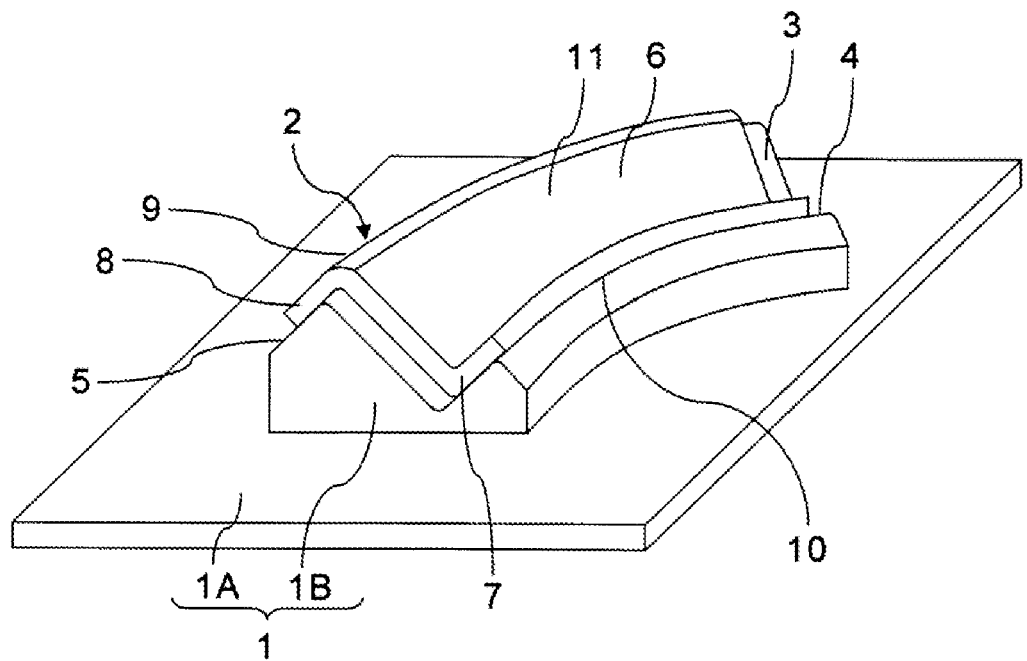
FIG. 8 is a perspective view illustrating a second example of shape of a preform that can be made by a preform figuring method according to an example of the invention.

FIG. 8 is a perspective view illustrating a second example of the shape of a preform 2 that can be formed by a preform figuring method according to an example of the invention.

As illustrated in FIG. 8, a preform 2 having a shape in which a curved inner flange 7 is provided on one side of a flat planar web 6 and a curved outer flange 8 is provided on another side of the flat planar web 6 can also be manufactured. Specifically, a preform 2 having a curved elongated structure whose cross-section is substantially a Z shape can also be manufactured. The preform 2 having such a shape, too, has a surface shape in which a curved surface 9 that is protuberant when viewed from the mountain bend side and a curved surface 10 that is depressed when viewed from the mountain bend side are coupled to a flat surface 11.

In this case, the protrusion 1B of the rigid-body figuring die 1 can be provided with a first figuring surface 3 that forms a flat surface for figuring the web 6 and a second figuring surface 4 and a third figuring surface 5 that form protuberant curved surfaces for figuring the inner flange 7 and the outer flange 8. Furthermore, the directions of normals to the first figuring surface 3, the second figuring surface 4, and the third figuring surface 5 can be tilted with respect to the vertical direction and the horizontal direction so that sheet-shape fibrous preparations 20 can be laid and stacked on the protrusion 1B while being bent.

In the case where a preform 2 having a shape illustrated in FIG. 8 is to be manufactured, too, bending a sheet-shape fibrous preparation 20 to form the inner flange 7 sometimes causes excessive tension to occur in fibers depending on the orientation angle of fibers. Therefore, in accordance with the orientation angle of fibers, a plurality of sheet-shape fibrous preparations 20 may be sized and disposed so that at least a fraction of the layers are each formed by a plurality of sheet-shape fibrous preparations 20 and so that, in an unfolded flat planar state, a plurality of sheet-shape fibrous preparations 20 have overlap regions 27.

This allows the preform 2 to be manufactured without forming a local gap that becomes a cause of loss of the continuity of fibers in the length direction nor causing occurrence of excessive tension acting in fibers in the length direction.

Figure 9:
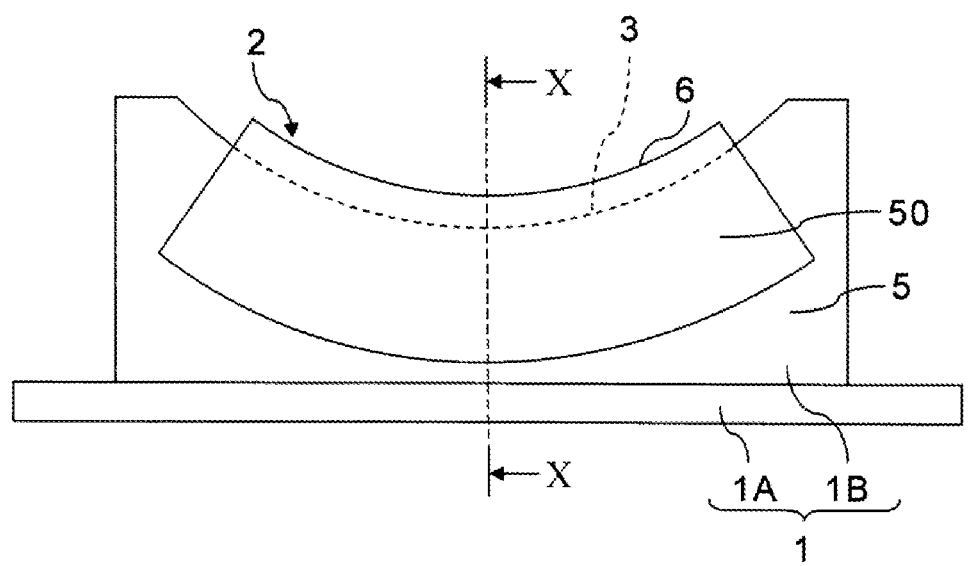
FIG. 9 is a side view illustrating a third example of shape of a preform that can be made by a preform figuring method according to an example of the invention.
Figure 10:
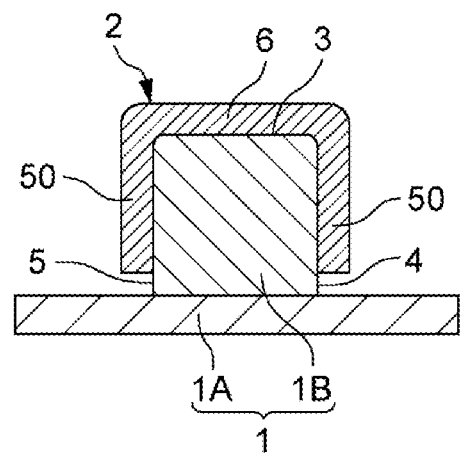
FIG. 10 is a cross-sectional view of the preform and the figuring die illustrated in FIG. 9 which is taken on line X-X of FIG. 9.

FIG. 9 is a side view illustrating a third example of the shape of a preform 2 that can be formed by a preform figuring method according to an example of the invention. FIG. 10 is a cross-sectional view of the preform 2 and the figuring die 1 illustrated in FIG. 9 which is taken on line X-X of FIG. 9.

As illustrated in FIG. 9 and FIG. 10, a preform 2 having a shape in which one of surfaces of a curved web 6 that is depressed when viewed from a mountain bend side is provided with two flat planar flanges 50 can also be manufactured. In this case, too, the preform 2 has a curved elongated structure.

Corresponding to this, the protrusion 1B of the rigid-body figuring die 1 can be provided with a first figuring surface 3 that has a depressed curved surface for figuring the web 6 from inside, and a second figuring surface 4 and a third figuring surface 5 that have two flat surfaces for figuring, from inside, the two flanges 50 on two sides of the web 6. Then, sheet-shape fibrous preparations 20 can be caused to extend along the second figuring surface 4 and the third figuring surface 5 by stacking the sheet-shape fibrous preparations 20 on the first figuring surface 3 provided with the depressed curved surface and then bending the sheet-shape fibrous preparations 20 along the two sides of the first figuring surface 3.

In the case where a preform 2 having a shape illustrated in FIG. 9 and FIG. 10 is to be manufactured, too, bending a single sheet-shape fibrous preparation 20 in order to form two flanges 50 on the two sides of the web 6 sometimes causes excessive tension to occur in fibers depending on the fiber orientation angle. Therefore, in accordance with the orientation angle of fibers, a plurality of sheet-shape fibrous preparations 20 can be sized and disposed so that at least a fraction of the layers will each be formed by a plurality of sheet-shape fibrous preparations 20 and so that, in a state of having been unfolded into a curved planar shape along the first figuring surface 3, the sheet-shape fibrous preparations 20 will have overlap regions 27.

This makes it possible to manufacture a preform 2 without allowing formation of a local gap that becomes a cause of loss of the continuity of fibers in the length direction nor causing the fibers to receive excessive tension that acts in the length direction of the fibers.

Figure 11:
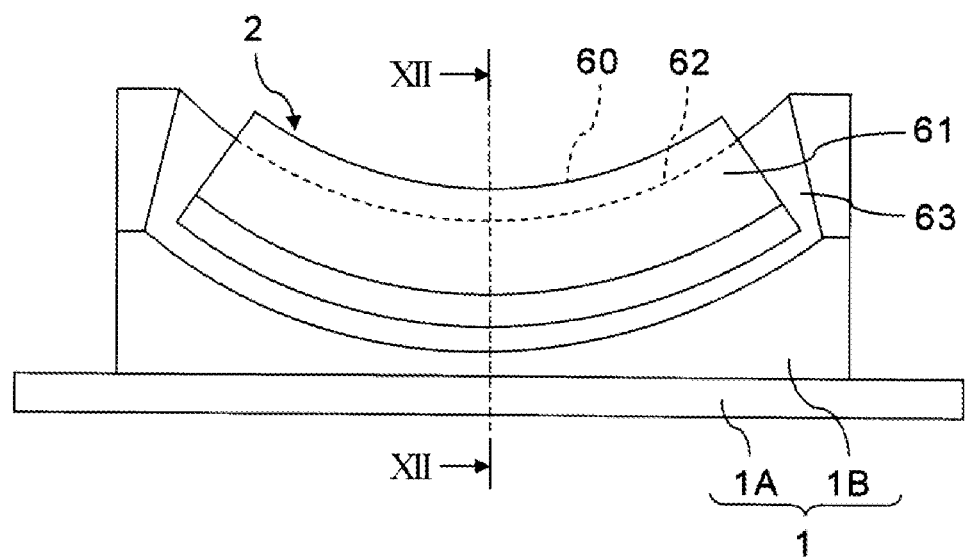
FIG. 11 is a side view illustrating a fourth example of shape of a preform that can be made by a preform figuring method according to an example of the invention.
Figure 12:
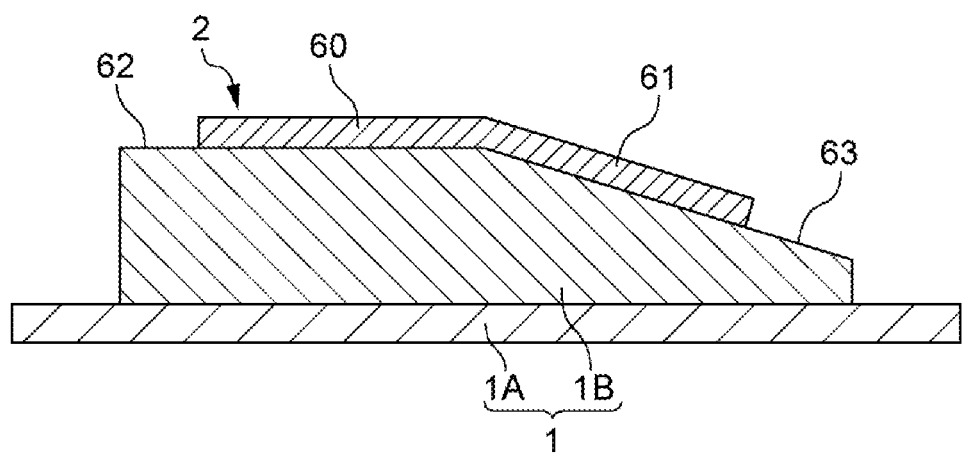
FIG. 12 is a longitudinal sectional view of the preform and the figuring die illustrated in FIG. 11 which is taken on line XII-XII of FIG. 11.

FIG. 11 is a side view illustrating a fourth example of the shape of a preform 2 that can be manufactured by a preform figuring method according to an example of the invention. FIG. 12 is a longitudinal sectional view of the preform 2 and the figuring die 1 illustrated in FIG. 11 which is taken on line XII-XII of FIG. 11.

As illustrated in FIG. 11 and FIG. 12, a preform 2 having a shape in which a curved surface first panel 60 that is depressed when viewed from a mountain bend side and a curved surface second panel 61 that is depressed when viewed from the mountain bend side are coupled to each other can also be manufactured.

Corresponding to this, the protrusion 1B of the rigid-body figuring die 1 can be provided with a first figuring surface 62 that has a depressed curved surface for figuring the first panel 60 and a second figuring surface 63 that has a depressed curved surface for figuring the second panel 61. Then, sheet-shape fibrous preparations 20 can be caused to extend along the second figuring surface 63 by stacking the sheet-shape fibrous preparations 20 on the first figuring surface 62 provided with the depressed curved surface and then bending the sheet-shape fibrous preparations 20 to the second figuring surface 63 side.

In the case where a preform 2 having a shape illustrated in FIG. 11 and FIG. 12 is to be manufactured, too, bending a single sheet-shape fibrous preparation 20 in order to form the second panel 61 sometimes causes excessive tension to occur in fibers depending on the fiber orientation angle. Therefore, in accordance with the orientation angle of fibers, a plurality of sheet-shape fibrous preparations 20 can be sized and disposed so that at least a fraction of the layers will each be formed by a plurality of sheet-shape fibrous preparations 20 and so that, in a state of having been unfolded into a curved planar shape along the first figuring surface 62, the sheet-shape fibrous preparations 20 will have overlap regions 27.

This makes it possible to manufacture a preform 2 without allowing formation of a local gap that becomes a cause of loss of the continuity of fibers in the length direction nor causing the fibers to receive excessive tension that acts in the length direction of the fibers.

As illustrated in the foregoing examples of shape, in any one of the case where sheet-shape fibrous preparations 20 laid and stacked on a flat figuring surface are bent so as to extend along a curved planar figuring surface, the case where sheet-shape fibrous preparations 20 laid and stacked on a curved figuring surface are bent so as to extend along the flat figuring surface, and the case where sheet-shape fibrous preparations 20 laid and stacked on a curved figuring surface are bent so as to extend along the curved figuring surface, at least a fraction of the layers can be formed by employing a shaping method in which the bending is performed after the plurality of sheet-shape fibrous preparations 20 are sized and disposed so that the sheet-shape fibrous preparations 20 have overlap regions 27.

Furthermore, the above-described shaping method can be employed not only in the case where the preform 2 has a shape in which a web is provided with a flange but also in the case where the preform 2 has a shape in which panels are coupled to each other and the case where the preform 2 has an elongated structure whose cross-section has an L shape.

That is, a preform 2 for a composite material that has a curved surface that corresponds to a curved surface of a figuring die 1 can be manufactured as a stack 30 of a plurality of sheet-shape fibrous preparations 20 that has a plurality of layers, by a stacking step of mounting and stacking a plurality of sheet-shape fibrous preparations 20 on a figuring die 1 that has a first figuring surface and a second figuring surface at least either one of which is a curved surface and a bending step of bending the plurality of sheet-shape fibrous preparations 20 mounted on the first figuring surface onto the second figuring surface. Then, by mounting a plurality of sheet-shape fibrous preparations 20 on the first figuring surface or on the sheet-shape fibrous preparations 20 adjacent in the stacking direction so as to partly overlap each other and bending, onto the second figuring surface, portions of the sheet-shape fibrous preparations 20 that have been mounted so as to overlap each other, at least a fraction of layers that constitute the stack 30 of sheet-shape fibrous preparations 20 can be formed. This makes it possible to manufacture a preform 2 without allowing formation of a local gap that becomes a cause of loss of the continuity of fibers in the length direction nor causing the fibers to receive excessive tension that acts in the length direction of the fibers.

For instance, by using a figuring die 1 that has a shape in which a depressed curved surface and a flat surface are coupled, a platy preform 2 having a shape in which a flat surface and a curved surface that is depressed when viewed from the mountain bend side can be manufactured. Alternatively, if a figuring die 1 that has a shape in which a first curved surface of the second order or of the third or higher order as a depressed curved surface and a second curved surface of the second order or of the third or higher order are coupled is used, a platy preform 2 having a shape in which the first curved surface of the second order or of the third or higher order and the second curved surface of the second order or of the third or higher order are coupled can be manufactured. Furthermore, if a plurality of sheet-shape fibrous preparations 20 mounted on the first figuring surface further are further bent along a bending line onto a third figuring surface that is a protuberant curved surface, a platy preform 2 that has a shape in which a curved surface that is protuberant when viewed from the mountain bend side is coupled to a flat surface or a curved surface can be manufactured.

Composite Material Shaping Method

Next, a shaping method for a composite material which uses as a raw material a preform 2 manufactured by the shaping method described above. The following description will be made regarding an example in which, using a preform 2 manufactured by the above-described shaping method, a composite material having a shape illustrated as an example in FIG. 1 is shaped.

In the case where a figured stack of prepregs is manufactured as a preform 2, the preform 2 may be heat-cured alone or may also be combined with another preform and heat-cured integrally therewith. In the case where a dry preform is manufactured as a preform 2, too, the preform 2 may be impregnated with resin and then heat-cured alone or may also be impregnated with resin and then heat-cured in combination with another preform. Furthermore, in the case where a preform 2 manufactured by the shaping method described above is combined with another preform, an intermediate curing process may be carried out as needed.

In the case where a stack of prepregs manufactured by the above-described shaping method is heat-cured alone, a composite material can be shaped by bagging the stack as illustrated in FIG. 6 or by heat-curing the stack of prepregs pressurized by pressing an upper die 40 against the stack as illustrated in FIG. 7, respectively, through the use of a heating apparatus 34 such as an oven or an autoclave apparatus.

In the case where a dry preform manufactured by the above-described shaping method is impregnated with resin and then heat-cured alone, a step of impregnating with resin the dry preform bagged as illustrated in FIG. 6 or clamped between an upper die 40 and a figuring die 1 as illustrated in FIG. 7 is carried out.

Figure 13:
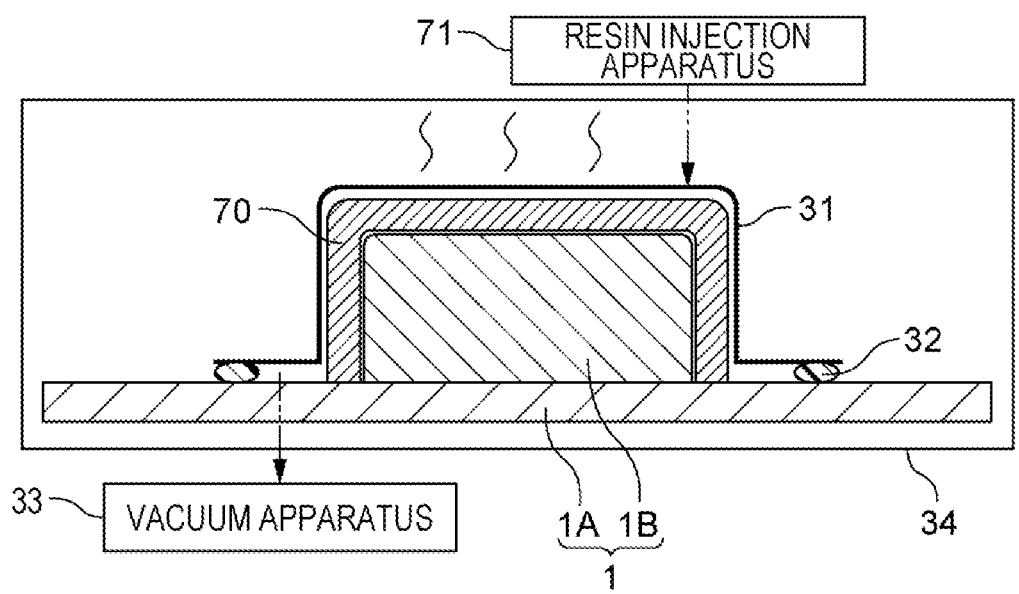
FIG. 13 is a cross-sectional view of a figuring die, illustrating an example in which, using a dry preform figured as a preform with the figuring die illustrated in FIG. 1, a composite material is shaped by a VaRTM method.

FIG. 13 is a cross-sectional view of the figuring die 1 illustrated in FIG. 1, illustrating an example in which a dry preform 70 figured as a preform 2 by the figuring die 1 is used to shape a composite material by a VaRTM method.

In the case where the dry preform 70 is used as a raw material to shape a composite material by the VaRTM method, the dry preform 70 bagged by using a bagging film 31, a sealant 32, and a vacuum apparatus 33 can be impregnated with resin.

Concretely, an uncured thermosetting resin can be injected by a resin injection apparatus 71 into a region tightly closed by the bagging film 31. Thus, the dry preform 70 is impregnated with the thermosetting resin.

Then, the resin impregnating the dry preform 70 is heat-cured by the heating apparatus 34 while being pressurized by bagging, whereby a composite material can be shaped. Note that the resin discharged from the resin injection apparatus 71 is usually heated in order to give fluidity. Therefore, when the resin is heat-cured, the resin is heated by the heating apparatus 34 from a temperature for maintaining the fluidity of the resin to a temperature at which the resin cures.

Figure 14:
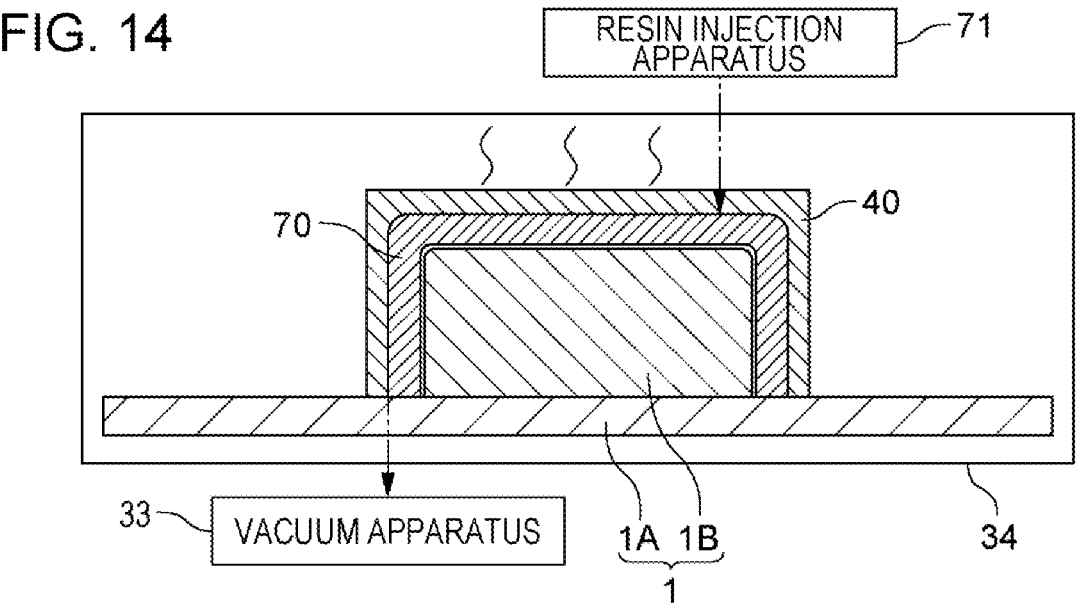
FIG. 14 is a cross-sectional view of a figuring die, illustrating an example in which, using a dry preform figured as a preform through the use of the figuring die illustrated in FIG. 1, a composite material is shaped by an RTM method that uses an upper die.

FIG. 14 is a cross-sectional view of the figuring die 1 illustrated in FIG. 1, illustrating an example in which a dry preform 70 figured as a preform 2 by the figuring die 1 is used to shape a composite material by the RTM method that uses the upper die 40.

In the case where the dry preform 70 is used as a raw material to shape a composite material by the RTM method that uses the upper die 40, the dry preform 70 disposed in a space formed between the upper die 40 and the figuring die 1 can be impregnated with resin. Concretely, while the vacuum apparatus 33 is being operated to vacuum the region formed between the upper die 40 and the figuring die 1, an uncured thermosetting resin can be injected into the region formed between the upper die 40 and the figuring die 1 by the resin injection apparatus 71. Thus, the dry preform 70 is impregnated with the thermosetting resin. Then, the resin impregnating the dry preform 70 is heat-cured by the heating apparatus 34, whereby a composite material can be shaped.

Composite Material

Next, a structure of a composite material manufactured by the above-described shaping method will be described.

The composite material manufactured by the above-described shaping method is a platy composite material that is made of a stack of resin layers reinforced with fiber and that has a bent shape. For instance, the shape of the composite material is a shape in which a flat planar first platy portion and a curved planar second platy portion that is depressed when viewed from the mountain bend side are coupled, similar to the first, second, and third examples of shape illustrated above with reference to FIG. 1 and FIGS. 8 to 10. Alternatively, similar to the fourth example of shape described with reference to FIG. 11 and FIG. 12, a shape in which a curved planar first platy portion that is depressed when viewed from the mountain bend side and a curved planar second platy portion that is depressed when viewed from the mountain bend side are coupled is sometimes formed.

Furthermore, of a plurality of resin layers that form one of the first platy portion and the second platy portion, at least a fraction of them are each formed by causing edges of sheet-shape fibrous preparations 20 to abut each other. Therefore, in some cases, depending on the fiber orientation angle, a composite material in which a plurality of threadlike fibers that reinforce at least a fraction of a plurality of resin layers constituting one of the first platy portion and the second platy portion and that are contained in a common first resin layer are all broken in a length direction, along a first straight or curved line is formed.

On the other hand, at least a fraction of a plurality of resin layers constituting the other one of the first platy portion and the second platy portion are each formed by causing edges of sheet-shape fibrous preparations 20 to abut each other. Therefore, in some cases, depending on the fiber orientation angle, a composite material in which a plurality of threadlike fibers that reinforce at least a fraction of a plurality of resin layers constituting the other one of the first platy portion and the second platy portion and that are contained in a common second resin layer whose edge fits an edge of the first resin layer are partly broken in the length direction, along a second straight or curved line that couples to the first straight or curved line at an end.

Aircraft Structural Part

Next, an example of an aircraft structural part formed by the above-described composite material will be described.

Figure 15:
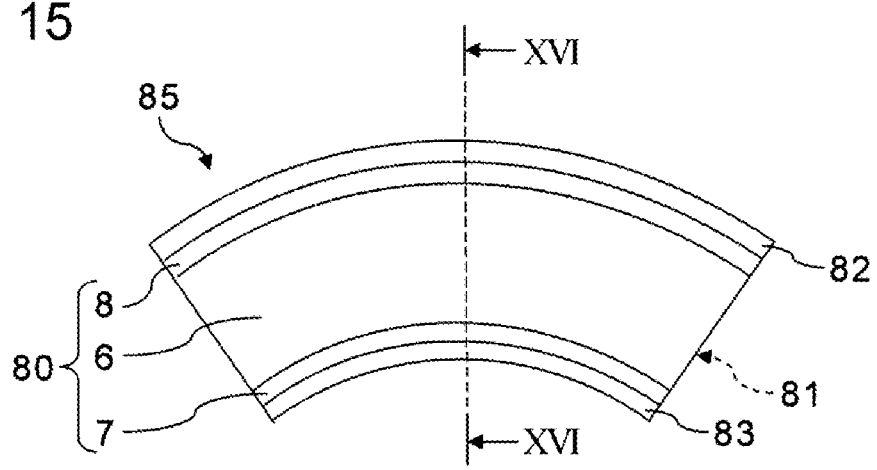
FIG. 15 is a side view illustrating an example of a composite material structural part that can be made by using a preform made through the use of the figuring die illustrated in FIG. 1.
Figure 16:
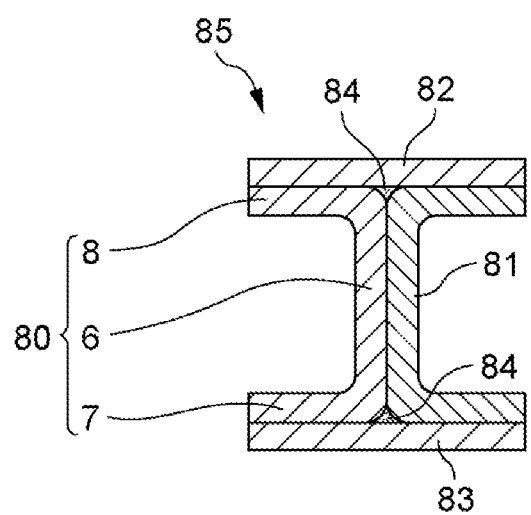
FIG. 16 is a cross-sectional view of the composite material structural part illustrated in FIG. 15 which is taken on line XVI-XVI of FIG. 15.

FIG. 15 is a side view illustrating an example of a composite material structural part that can be manufactured by using the preform 2 manufactured through the use of the figuring die 1 illustrated in FIG. 1. FIG. 16 is a cross-sectional view of the composite material structural part illustrated in FIG. 15 which is taken on line XVI-XVI.

As illustrated in FIG. 15 and FIG. 16, a composite material 80 having the configuration (formed by the web 6 and the two flanges 7 and 8) illustrated in FIG. 1 and a composite material 81 having a configuration symmetrical to the configuration of the composite material 80 which is illustrated in FIG. 1 with respect to a plane can be joined, with the webs 6 of the two composite materials 80 and 81 pasted together, and can be disposed between two curved platy composite materials 82 and 83. Furthermore, two gaps formed between the flat platy composite materials 82 and 83 and the two composite materials 80 and 81 symmetrical to each other about a plane can be filled with a filler 84 formed by a composite material.

The, a reinforcing material 85, such as a frame, a spar, a rib, or a stringer, that has an I-shape cross-section and that is curved in the length direction can be manufactured as an aircraft structural part. Of course, curved reinforcing materials whose cross-sections have shapes other than an I shape can be similarly manufactured as aircraft structural parts. Specifically, using a composite material manufactured by the above-described shaping method, a composite material structural part for an aircraft can be manufactured.

Furthermore, in the example illustrated in FIGS. 15 and 16, if the platy composite materials 82 and 83 are substituted with an upper surface panel and a lower surface panel, a composite material structural part in which the upper surface panel and the lower surface panel have been coupled by a reinforcing material can be manufactured as an aircraft structural part As another example, if the composite material manufactured by the above-described shaping method is a composite material having a curved elongated structure whose cross-sectional shape is an L shape or a composite material having a curved elongated structure whose cross-sectional shape is a Z shape, the composite material can be used as a curved reinforcing material without being combined with another composite material. Furthermore, if two composite materials symmetrical to each other about a plane that each have a curved elongated structure whose cross-sectional shape is an L shape are placed abutting each other, a reinforcing material having a curved elongated structure whose cross-sectional shape is an inverted T shape can be manufactured.

Furthermore, besides reinforcing materials, a stepped panel and a panel that partly tapers can also be manufactured as aircraft structural parts by heat-curing a preform 2 that has a shape in which a curved first panel 60 and a curved second panel 61 as illustrated as an example in FIG. 11 and FIG. 12 are coupled.

Note that in the case where a composite material structural part is to be manufactured by combining a composite material manufactured by the above-descried shaping method with another composite material, the composite material manufactured by a shaping method described above can be combined with another composite material before or after heat curing. Specifically, a plurality of composite materials may be adhered together by adhesive after the composite materials have been separately heat-cured, and a co-curing process in which composite materials that are yet to be heat-cured are combined and then adhered and cured simultaneously may be carried out.

Furthermore, in the case where a composite material structural part is to be manufactured by combining a composite material manufactured by a shaping method described above with another composite material, the strength of the composite material manufactured by the above-described shaping method can be reinforced by combining the composite material with another composite material at least a fraction of whose fibers have a different length direction. In this case, even if end portions of many threadlike fibers are disposed on a single plane and therefore the composite material has a reduced strength, the other composite material that is combined can add to the strength. Therefore, in the case where a composite material is to be shaped as a unidirectional material that has a uniform fiber length direction, even if the locations of overlap regions 27 between sheet-shape fibrous preparations 20 are not varied among layers, the other composite material makes it possible to secure a strength. In this case, automatization of the stacking of sheet-shape fibrous preparations 20 by an automatic stacking apparatus becomes easy.

Advantageous Effects

According to the preform figuring methods and the composite material shaping methods as described above, even a preform 2 and a composite material having a shape in which two platy portions at least either one of which is curved with a large curvature can be figured and shaped without allowing occurrence of excessive tension in the fibers nor allowing formation of a local gap. As a result, the reduction of strength of a composite material can be reduced. Therefore, it becomes possible to manufacture even a composite material curved with a large curvature, which, according to the related art, is difficult to manufacture because a strength cannot be secured.

Other Examples

While specific examples have been described above, the above-described examples are mere examples and do not limit the scope of the invention. The novel methods and apparatuses described herein can also be embodied in various other modes. Furthermore, in the modes of the methods and apparatuses described herein, various omissions, substitutions, and modifications can be made without departing from the gist of the invention. Such various modes and modifications are encompassed by the appended claims and their equivalents as being covered by the scope and gist of the invention.

The invention claimed is:

1. A preform figuring method comprising:
   mounting and stacking a plurality of sheet-shape fibrous preparations that are yet to be impregnated with a thermosetting resin or that have been impregnated with the thermosetting resin on a figuring die, wherein the figuring die comprises a shape that is formed by a flat plate and a protrusion formed on the flat plate, the protrusion has a first figuring surface that is a flat top surface, a second figuring surface that is a concave curved surface of the protrusion on its radially inner side, and a third figuring surface that is a convex curved surface of the protrusion on its radially outer side; and
   making a preform for a composite material, the preform having a curved inner flange formed by bending the plurality of sheet-shape fibrous preparations mounted on the first figuring surface onto the second figuring surface, a curved outer flange formed by bending the plurality of sheet-shape fibrous preparations mounted on the first figuring surface onto the third figuring surface, and a flat planar web that is coupled with the curved inner flange and the curved outer flange, wherein
   the preform is formed as a stack of the plurality of sheet-shape fibrous preparations which has a plurality of layers,
   a layer of the stack of the plurality of sheet-shapes fibrous preparations has a first sheet-shape fibrous preparation, a second sheet-shape fibrous preparation and a third sheet-shape fibrous preparation,
   the first sheet-shape fibrous preparation is configured to form:
   an entirety of the curved outer flange that forms a side having a smaller curvature of the preform;
   a portion of the flat planar web that includes a central portion of the flat planar web; and
   a portion of the curved inner flange that forms a side having a larger curvature of the preform, the portion of the curved inner flange including a central portion of the curved inner flange,
   the second sheet-shape fibrous preparation is configured to form:
   a portion of the flat planar web that includes a side end portion of the flat planar web; and
   a portion of the curved inner flange that includes a side end portion of the curved inner flange,
   the third sheet-shape fibrous preparation is configured to form:
   a portion of the flat planar web that includes another side end portion of the flat planar web; and
   a portion of the curved inner flange that includes another side end portion of the curved inner flange, and
   at least a fraction of the layers that constitute the stack are formed by mounting the plurality of sheet-shape fibrous preparations on the first figuring surface or on the sheet-shape fibrous preparation adjacent in a stacking direction so that the plurality of sheet-shape fibrous preparations partly overlap each other and bending portions of the plurality of sheet-shape fibrous preparations mounted so as to overlap onto the second figuring surface, and
   wherein a fiber length direction is varied among at least the fraction of the layers included in the stack.

2. The preform figuring method according to claim 1, wherein the plurality of sheet-shape fibrous preparations that are mounted so as to overlap are sized such that, when portions of the plurality of sheet-shape fibrous preparation mounted so as to overlap are bent onto the second figuring surface, a fraction of adjacent edges of the bent sheet-shape fibrous preparations fit each other.

3. The preform figuring method according to claim 1, wherein the plurality of sheet-shape fibrous preparations that are mounted so as to overlap are sized so that, when portions of the sheet-shape fibrous preparations mounted so as to overlap are bent onto the second figuring surface, remainder portions of the sheet-shape fibrous preparations remain on the first figuring surface.

4. The preform figuring method according to claim 1, wherein locations at which portions of the sheet-shape fibrous preparations overlap each other are varied among at least a fraction of the layers in the stack.

5. The preform figuring method according to claim 1, wherein the fiber length direction and locations of regions of the overlap are varied among at least the fraction of the layers in the stack.

6. The preform figuring method according to claim 1, wherein, by using the figuring die that has a second shape in which the convex curved surface and the flat surface are coupled, a platy preform including a third shape in which a concave curved surface that is depressed when viewed from a mountain bend side and a flat surface are coupled is made.

7. The preform figuring method according to claim 1, wherein, by using the figuring die that has a second shape in which a first curved surface of a second order or of a higher order as a depressed curved surface and a second curved surface of the second order or of the higher order are coupled, a platy preform including a third shape in which the first curved surface of the second order or of the higher order and the second curved surface of the second order or of the higher order are coupled is made.

8. The preform figuring method according to claim 1, wherein, by further using the figuring die that has the third figuring surface that comprises the convex curved surface and bending the plurality of sheet-shape fibrous preparations mounted on the first figuring surface onto the third figuring surface, a platy preform including a second shape in which a convex curved surface that is protuberant when viewed from a mountain bend side is coupled to either one of a flat surface and a concave curved surface is made.

9. The preform figuring method according to claim 1, wherein the preform is shaped into a dry shaped preform or into a shaped stack of prepreg.

10. The preform figuring method according to claim 1, wherein an orientation angle of a fiber of the plurality of sheet-shape fibrous preparations is varied for each layer of said layers.

11. The preform figuring method according to claim 1, wherein an orientation angle of a fiber of the plurality of sheet-shape fibrous perpetrations is varied for each two layers of said layers.

12. The preform figuring method according to claim 1, wherein, in accordance with an orientation angle of fibers of the sheet-shape fibrous preparations of the plurality of sheet-shape fibrous preparations, the plurality of sheet-shape fibrous preparations are sized and disposed so that at least some of the plurality of layers are each formed by the plurality of sheet-shape fibrous preparations so that, in an unfolded planar state, the plurality of sheet-shape fibrous preparations have regions of the overlap.

13. The preform figuring method according to claim 1, wherein a portion of the first sheet-shape fibrous preparation is an object to be bent along a bending line for the outer flange, and wherein the portion of the first sheet-shape fibrous preparation is provided with V-shape cuts.

14. A composite material shaping method comprising:
making a dry preform by the preform figuring method according to claim 1; and
shaping the composite material by impregnating the dry preform with the thermosetting resin and then heat-curing the thermosetting resin.

15. A composite material shaping method comprising:
making a figured stack of prepregs by the preform figuring method according to claim 1; and
shaping the composite material by heat-curing the figured stack of prepregs.

16. The composite material shaping method according to claim 14, further comprising making a composite material structural part by combining, after or before heat-curing the composite material, the composite material with another composite material at least a fraction of whose fibers have a different length direction.

17. The composite material shaping method according to claim 14, wherein a composite material structural part for an aircraft is made by using the composite material shaped by heat curing.

* * * * *